(12) United States Patent
Lin

(10) Patent No.: US 12,517,925 B2
(45) Date of Patent: Jan. 6, 2026

(54) ASYNCHRONOUS TRANSACTION CONFLICT RESOLUTION

(71) Applicant: Kinaxis Inc., Ottawa (CA)

(72) Inventor: Angela Lin, Ottawa (CA)

(73) Assignee: Kinaxis Inc., Ottawa (CA)

( * ) Notice: Subject to any disclaimer, the term of this patent is extended or adjusted under 35 U.S.C. 154(b) by 15 days.

(21) Appl. No.: 17/956,091

(22) Filed: Sep. 29, 2022

(65) Prior Publication Data

US 2023/0107071 A1 Apr. 6, 2023

Related U.S. Application Data

(60) Provisional application No. 63/251,106, filed on Oct. 1, 2021.

(51) Int. Cl.
G06F 16/27 (2019.01)
(52) U.S. Cl.
CPC ................................. G06F 16/273 (2019.01)
(58) Field of Classification Search
CPC .................................................. G06F 16/273
USPC ............................................................ 707/615
See application file for complete search history.

(56) References Cited

U.S. PATENT DOCUMENTS

| | | | |
|---|---|---|---|
| 5,960,436 A | 9/1999 | Chang et al. | |
| 7,324,995 B2 | 1/2008 | Findleton et al. | |
| 7,996,633 B2 | 8/2011 | Zimmerer et al. | |
| 9,710,532 B2 | 7/2017 | Yurchenko et al. | |
| 9,740,582 B2 | 8/2017 | Eluri et al. | |
| 9,904,721 B1 | 2/2018 | Holenstein et al. | |
| 10,191,765 B2 | 1/2019 | Kim et al. | |
| 10,503,720 B2 | 12/2019 | Chao et al. | |
| 10,956,324 B1* | 3/2021 | Giles | G06F 9/526 |
| 11,630,838 B1* | 4/2023 | Gujral | G06F 16/9024 |
| | | | 707/625 |
| 2004/0030703 A1* | 2/2004 | Bourbonnais | G06F 16/2379 |
| 2008/0163222 A1* | 7/2008 | Bourbonnais | G06F 16/273 |
| | | | 718/101 |
| 2009/0033662 A1* | 2/2009 | Murrah | G06T 15/02 |
| | | | 345/426 |
| 2009/0089459 A1* | 4/2009 | Jeyaseelan | H04L 49/90 |
| | | | 710/7 |
| 2009/0172306 A1* | 7/2009 | Nussbaum | G06F 9/466 |
| | | | 712/229 |
| 2010/0191884 A1* | 7/2010 | Holenstein | G06F 16/2343 |
| | | | 707/613 |
| 2010/0228927 A1* | 9/2010 | Levanoni | G06F 9/467 |
| | | | 711/E12.001 |
| 2011/0161603 A1* | 6/2011 | Taillefer | G06F 9/466 |
| | | | 711/150 |
| 2012/0173589 A1* | 7/2012 | Kwon | G06F 16/248 |
| | | | 707/E17.005 |
| 2013/0297977 A1 | 11/2013 | Macfarlane | |
| 2016/0350363 A1* | 12/2016 | Raja | G06F 16/2343 |
| 2018/0136840 A1* | 5/2018 | Ouyang | G06F 3/0688 |
| 2018/0232412 A1* | 8/2018 | Bensberg | G06F 11/1441 |
| 2018/0253468 A1* | 9/2018 | Gurajada | G06F 16/2255 |
| 2018/0260287 A1* | 9/2018 | Iyer | G06F 11/1464 |
| 2018/0373560 A1* | 12/2018 | Peng | G06F 16/2282 |

(Continued)

*Primary Examiner* — Amy Ng
*Assistant Examiner* — Antonio J Caiado
(74) *Attorney, Agent, or Firm* — Ruggiero McAllister & McMahon LLC

(57) ABSTRACT

Methods and systems for resolving these transaction conflicts in a way that does not involve aborting or rolling back conflicting transactions.

18 Claims, 20 Drawing Sheets

(56) References Cited

U.S. PATENT DOCUMENTS

| | | | |
|---|---|---|---|
| 2019/0121657 A1 | 4/2019 | Kim et al. | |
| 2019/0325055 A1* | 10/2019 | Lee | G06F 11/1448 |
| 2019/0340168 A1* | 11/2019 | Raman | G06F 11/2007 |
| 2020/0356449 A1* | 11/2020 | Bensberg | G06F 11/1474 |
| 2021/0110474 A1* | 4/2021 | Morrow | G06Q 20/381 |
| 2021/0365349 A1* | 11/2021 | Katami | G06F 11/323 |
| 2022/0067728 A1* | 3/2022 | Bellamy | G06Q 20/401 |
| 2022/0309011 A1* | 9/2022 | Nagarajan | G06F 12/0238 |
| 2022/0317931 A1* | 10/2022 | Lee | G06F 3/0604 |
| 2023/0055715 A1* | 2/2023 | Luo | G06F 16/2343 |
| 2023/0081900 A1* | 3/2023 | Werner | G06F 16/2379 |
| | | | 707/703 |

\* cited by examiner

ASYNCHRONOUS TRANSACTION CONFLICT RESOLUTION

CROSS-REFERENCE TO RELATED APPLICATIONS

The present application claims the benefit of U.S. Patent Application No. 63/251,106, filed Oct. 1, 2021, and is expressly incorporated by reference in its entirety herein.

BACKGROUND

In a database cluster, to improve transaction throughput, transactions are asynchronously committed in parallel on different nodes. This means that nodes may commit conflicting transactions.

BRIEF SUMMARY

Disclosed herein are methods and systems for resolving these transaction conflicts in a way that does not involve aborting or rolling back conflicting transactions.

In one aspect, a computer-implemented method includes applying, by a processor, one or more transactions to a private in-memory database representation of a data server node, capturing, by the processor, contents of a pending transaction in a commit job, sending, by the processor, the commit job to a pending commit queue of the database node, executing, by the processor, the commit job, updating, by the processor, a cluster transaction counter, assigning, by the processor, a transaction identification number to the commit job, block waiting, by the processor, for all preceding transactions to be replayed, and continuously replaying, by the processor, one or more transaction log entries from a cluster transaction log. The computer-implemented method also includes detecting, by the processor, a conflict between an incoming transaction and the private in-memory database representation merging, by the processor, the incoming transaction with a private in-memory state, thereby generating an amendment, and batching together, by the processor, the amendment and each pending transaction of the database node into a single conflict resolution transaction.

The computer-implemented method may further include: committing, by the processor, the conflict resolution transaction to a local store, committing, by the processor, the conflict resolution transaction to a cluster transaction log, and appending the conflict resolution transaction to a committed transaction set.

In some embodiments of the computer-implemented method, the conflict is detected using a private sequence map of the database node. In some embodiments of the computer-implemented method, the incoming transaction is excluded from the pending commit queue. In some embodiments of the computer-implemented method, the merging is according to one or more user-defined rules for resolving the conflict. Other technical features may be readily apparent to one skilled in the art from the following figures, descriptions, and claims.

In one aspect, a computing apparatus includes a processor. The computing apparatus also includes a memory storing instructions that, when executed by the processor, configure the apparatus to apply, by the processor, one or more transactions to a private in-memory database representation of a data server node, capture, by the processor, contents of a pending transaction in a commit job, send, by the processor, the commit job to a pending commit queue of the database node, execute, by the processor, the commit job, update, by the processor, a cluster transaction counter, assign, by the processor, a transaction identification number to the commit job, block wait, by the processor, for all preceding transactions to be replayed, and continuously replay, by the processor, one or more transaction log entries from a cluster transaction log. The computing apparatus also includes detect, by the processor, a conflict between an incoming transaction and the private in-memory database representation merge, by the processor, the incoming transaction with a private in-memory state, thereby generating an amendment. The computing apparatus also includes batch together, by the processor, the amendment and each pending transaction of the database node into a single conflict resolution transaction.

The computing apparatus may also include instructions that further configure the apparatus to commit, by the processor, the conflict resolution transaction to a local store, commit, by the processor, the conflict resolution transaction to a cluster transaction log, and append the conflict resolution transaction to a committed transaction set.

In some embodiments of the computing apparatus, the conflict is detected using a private sequence map of the database node. In some embodiments of the computing apparatus, the incoming transaction is excluded from the pending commit queue. In some embodiments of the computing apparatus, merging is according to one or more user-defined rules for resolving the conflict. Other technical features may be readily apparent to one skilled in the art from the following figures, descriptions, and claims.

In one aspect, a non-transitory computer-readable storage medium, the computer-readable storage medium including instructions that when executed by a computer, cause the computer to apply, by a processor, one or more transactions to a private in-memory database representation of a data server node, capture, by the processor, contents of a pending transaction in a commit job, send, by the processor, the commit job to a pending commit queue of the database node, execute, by the processor, the commit job, update, by the processor, a cluster transaction counter, assign, by the processor, a transaction identification number to the commit job, block wait, by the processor, for all preceding transactions to be replayed, and continuously replay, by the processor, one or more transaction log entries from a cluster transaction log. The non-transitory computer-readable storage medium also includes detect, by the processor, a conflict between an incoming transaction and the private in-memory database representation merge, by the processor, the incoming transaction with a private in-memory state, thereby generating an amendment, and batch together, by the processor, the amendment and each pending transaction of the database node into a single conflict resolution transaction.

The computer-readable storage medium may also include instructions that further configure the computer to commit, by the processor, the conflict resolution transaction to a local store, commit, by the processor, the conflict resolution transaction to a cluster transaction log, and append the conflict resolution transaction to a committed transaction set.

In some embodiments of the computer-readable storage medium, the conflict is detected using a private sequence map of the database node. In some embodiments of the computer-readable storage medium, the incoming transaction is excluded from the pending commit queue. In some embodiments of the computer-readable storage medium, merging is according to one or more user-defined rules for resolving the conflict. Other technical features may be readily apparent to one skilled in the art from the following figures, descriptions, and claims.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced. Like reference numbers and designations in the various drawings indicate like elements.

DETAILED DESCRIPTION

Figure 1:
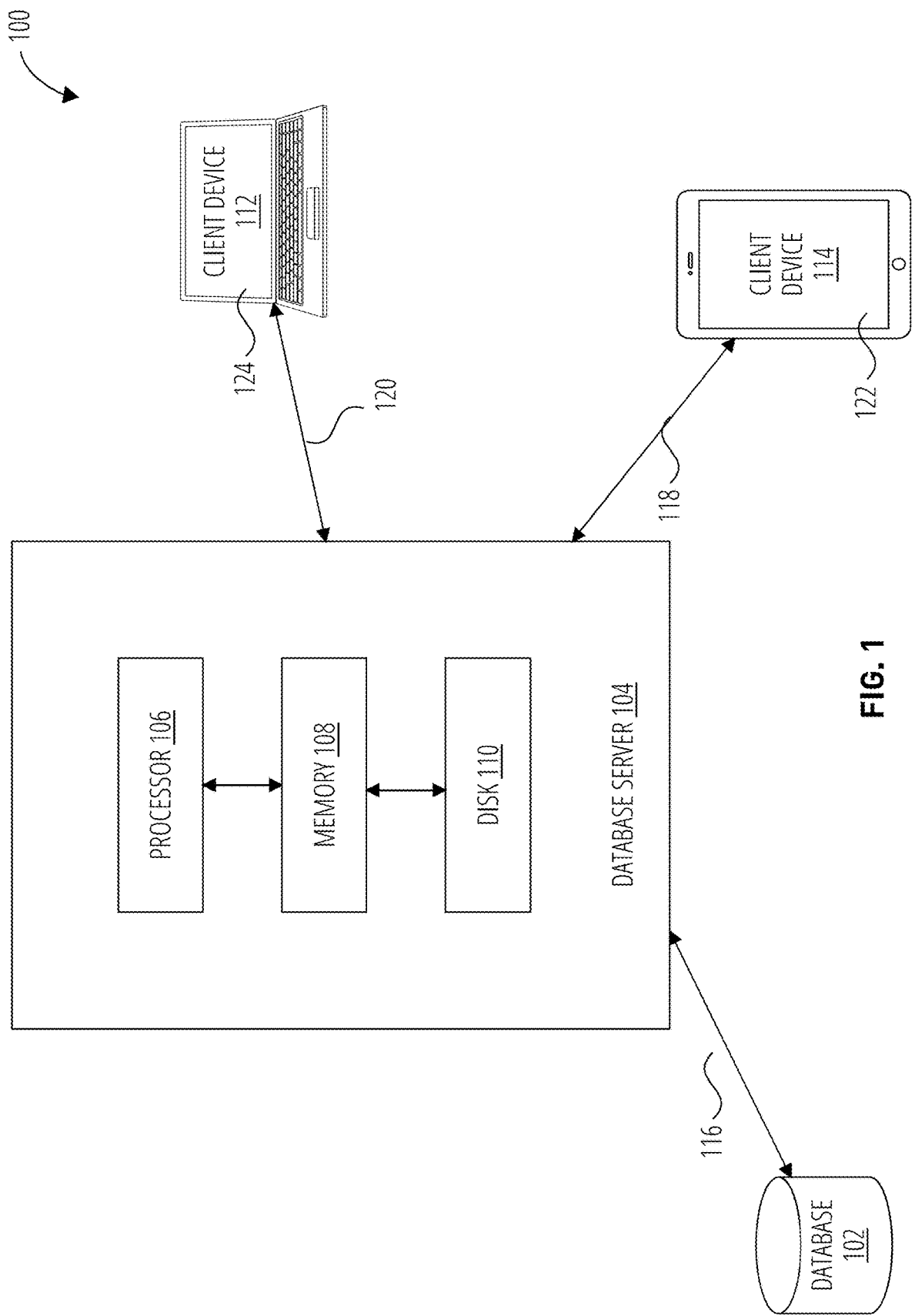
FIG. 1 illustrates an example of a system for asynchronous transaction conflict resolution in accordance with one embodiment.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

A computer program (which may also be referred to or described as a software application, code, a program, a script, software, a module or a software module) can be written in any form of programming language. This includes compiled or interpreted languages, or declarative or procedural languages. A computer program can be deployed in many forms, including as a module, a subroutine, a stand-alone program, a component, or other unit suitable for use in a computing environment. A computer program can be deployed to be executed on one computer or can be deployed on multiple computers that are located at one site or distributed across multiple sites and interconnected by a communication network.

As used herein, a "software engine" or an "engine," refers to a software implemented system that provides an output that is different from the input. An engine can be an encoded block of functionality, such as a platform, a library, an object or a software development kit ("SDK"). Each engine can be implemented on any type of computing device that includes one or more processors and computer readable media. Furthermore, two or more of the engines may be implemented on the same computing device, or on different computing devices. Non-limiting examples of a computing device include tablet computers, servers, laptop or desktop computers, music players, mobile phones, e-book readers, notebook computers, PDAs, smart phones, or other stationary or portable devices.

The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows that can be performed by an apparatus, can also be implemented as a graphics processing unit (GPU).

Computers suitable for the execution of a computer program include, by way of example, general or special purpose microprocessors or both, or any other kind of central processing unit. Generally, a central processing unit receives instructions and data from a read-only memory or a random access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive.

Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry.

To provide for interaction with a user, embodiments of the subject matter described herein can be implemented on a computer having a display device for displaying information to the user and input devices by which the user can provide input to the computer (for example, a keyboard, a pointing device such as a mouse or a trackball, etc.). Other kinds of devices can be used to provide for interaction with a user. Feedback provided to the user can include sensory feedback (e.g., visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser.

Embodiments of the subject matter described in this specification can be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN").

The computing system can include clients and servers. A client and server are generally remote from each other and typically interact through a communication network. The relationship of client and server arises by virtue of computer programs running on the respective computers and having a client-server relationship to each other.

FIG. 1 illustrates an example of a system 100 for asynchronous transaction conflict resolution.

System 100 includes a database server 104, a database 102, and client devices 112 and 114. Database server 104 can include a memory 108, a disk 110, and one or more processors 106. In some embodiments, memory 108 can be volatile memory, compared with disk 110 which can be non-volatile memory. In some embodiments, database server 104 can communicate with database 102 using interface 116. Database 102 can be a versioned database or a database that does not support versioning. While database 102 is illustrated as separate from database server 104, database 102 can also be integrated into database server 104, either as a separate component within database server 104, or as part of at least one of memory 108 and disk 110. A versioned database can refer to a database which provides numerous complete delta-based copies of an entire database. Each complete database copy represents a version. Versioned databases can be used for numerous purposes, including simulation and collaborative decision-making.

System 100 can also include additional features and/or functionality. For example, system 100 can also include additional storage (removable and/or non-removable) including, but not limited to, magnetic or optical disks or tape. Such additional storage is illustrated in FIG. 1 by memory 108 and disk 110. Storage media can include volatile and nonvolatile, removable and non-removable media implemented in any method or technology for storage of information such as computer-readable instructions, data structures, program modules or other data. Memory 108 and disk 110 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 100. Any such non-transitory computer-readable storage media can be part of system 100.

System 100 can also include interfaces 116, 118 and 120. Interfaces 116, 118 and 120 can allow components of system 100 to communicate with each other and with other devices. For example, database server 104 can communicate with database 102 using interface 116. Database server 104 can also communicate with client devices 112 and 114 via interfaces 120 and 118, respectively. Client devices 112 and 114 can be different types of client devices; for example, client device 112 can be a desktop or laptop, whereas client device 114 can be a mobile device such as a smartphone or tablet with a smaller display. Non-limiting example interfaces 116, 118 and 120 can include wired communication links such as a wired network or direct-wired connection, and wireless communication links such as cellular, radio frequency (RF), infrared and/or other wireless communication links. Interfaces 116, 118 and 120 can allow database server 104 to communicate with client devices 112 and 114 over various network types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). The various network types to which interfaces 116, 118 and 120 can connect can run a plurality of network protocols including, but not limited to Transmission Control Protocol (TCP), Internet Protocol (IP), real-time transport protocol (RTP), realtime transport control protocol (RTCP), file transfer protocol (FTP), and hypertext transfer protocol (HTTP).

Using interface 116, database server 104 can retrieve data from database 102. The retrieved data can be saved in disk 110 or memory 108. In some cases, database server 104 can also comprise a web server, and can format resources into a format suitable to be displayed on a web browser. Database server 104 can then send requested data to client devices 112 and 114 via interfaces 120 and 118, respectively, to be displayed on applications 122 and 124. Applications 122 and 124 can be a web browser or other application running on client devices 112 and 114.

The systems and methods disclosed herein comprise a database node; a cluster transaction log; and a cluster transaction counter. Each is further described below.

The cluster transaction log is a persistent record of an ordered sequence of transaction log entries. A transaction log entry is a persistent record of a transaction on the database. A transaction is an ACID operation/action on the database. That is, the transaction is defined by the following set of four key properties: Atomicity, Consistency, Isolation, and Durability. The terms "transaction" and "transaction log entry" also refer to the content of the persistent record, in the context of: generating the content, storing the content into persistent storage, or transmitting the content/a copy of the content. There is a single cluster transaction log for all database nodes in the cluster. The transactions in the cluster transaction log are transmitted to every database node in the cluster using a distributed event logging system, such as, but not limited to Kafka®. Each database node may append transaction log entries to the log. Each database node also continuously reads transaction log entries in a process known as "transaction replay", or simply "replay".

A cluster transaction counter can be maintained in, for example, a distributed key-value store, such as, but not limited to ZooKeeper™.

Figure 2:
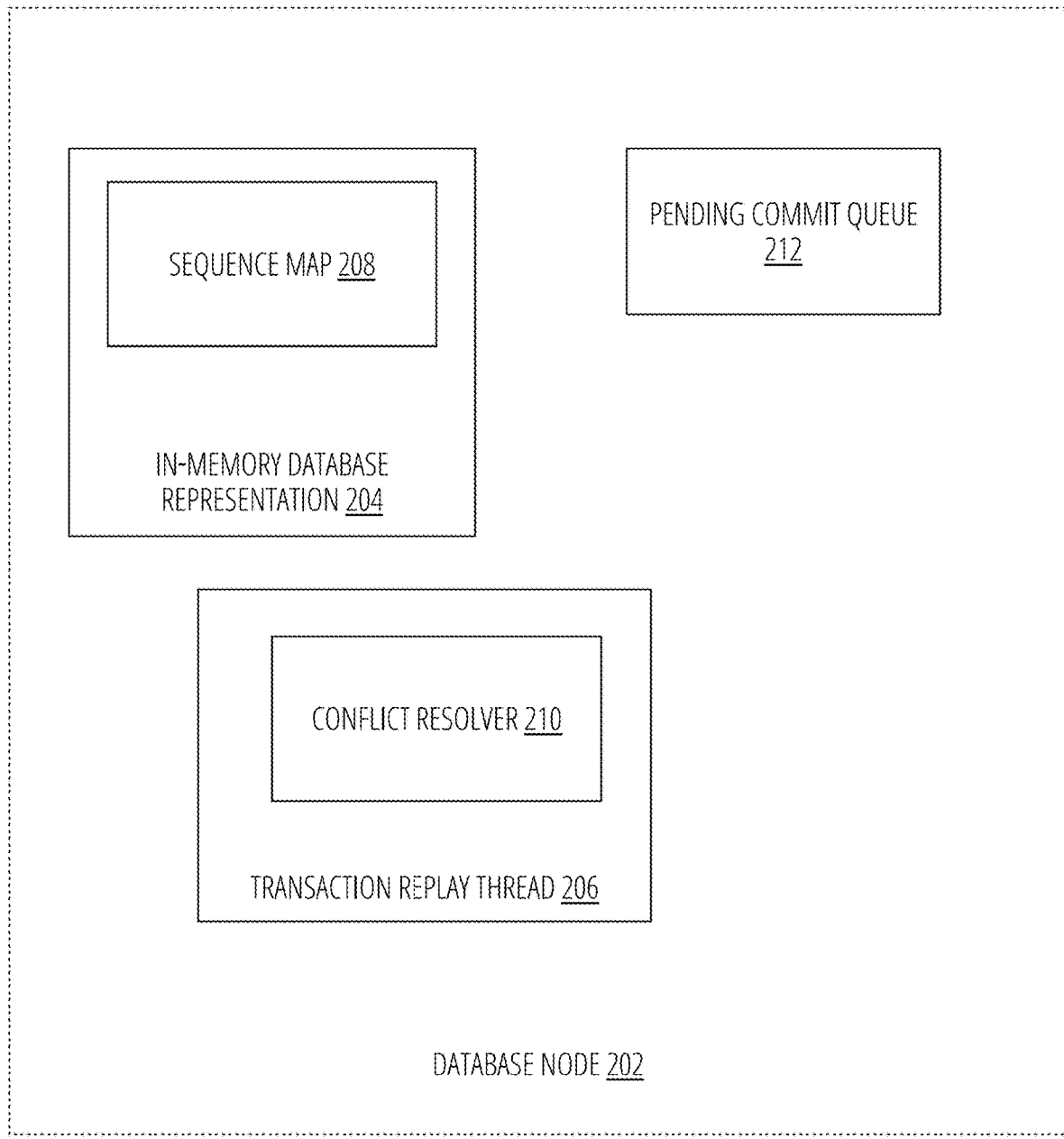
FIG. 2 illustrates a database node in accordance with one embodiment.

FIG. 2 illustrates a database node 102 in accordance with one embodiment. Each database node 102 includes a private in-memory database representation 204, which in turn, includes a sequence map 208. Database node 102 also includes a Pending Commit Queue 212 which is a data structure external to in-memory database representation 204. A transaction replay thread 206 is a process that executes within database node 102. Another process, Conflict Resolver 210, is a sub-process of transaction replay thread 206. Pending Commit Queue 212 generates a transaction "amendment", which is defined below.

Figure 3:
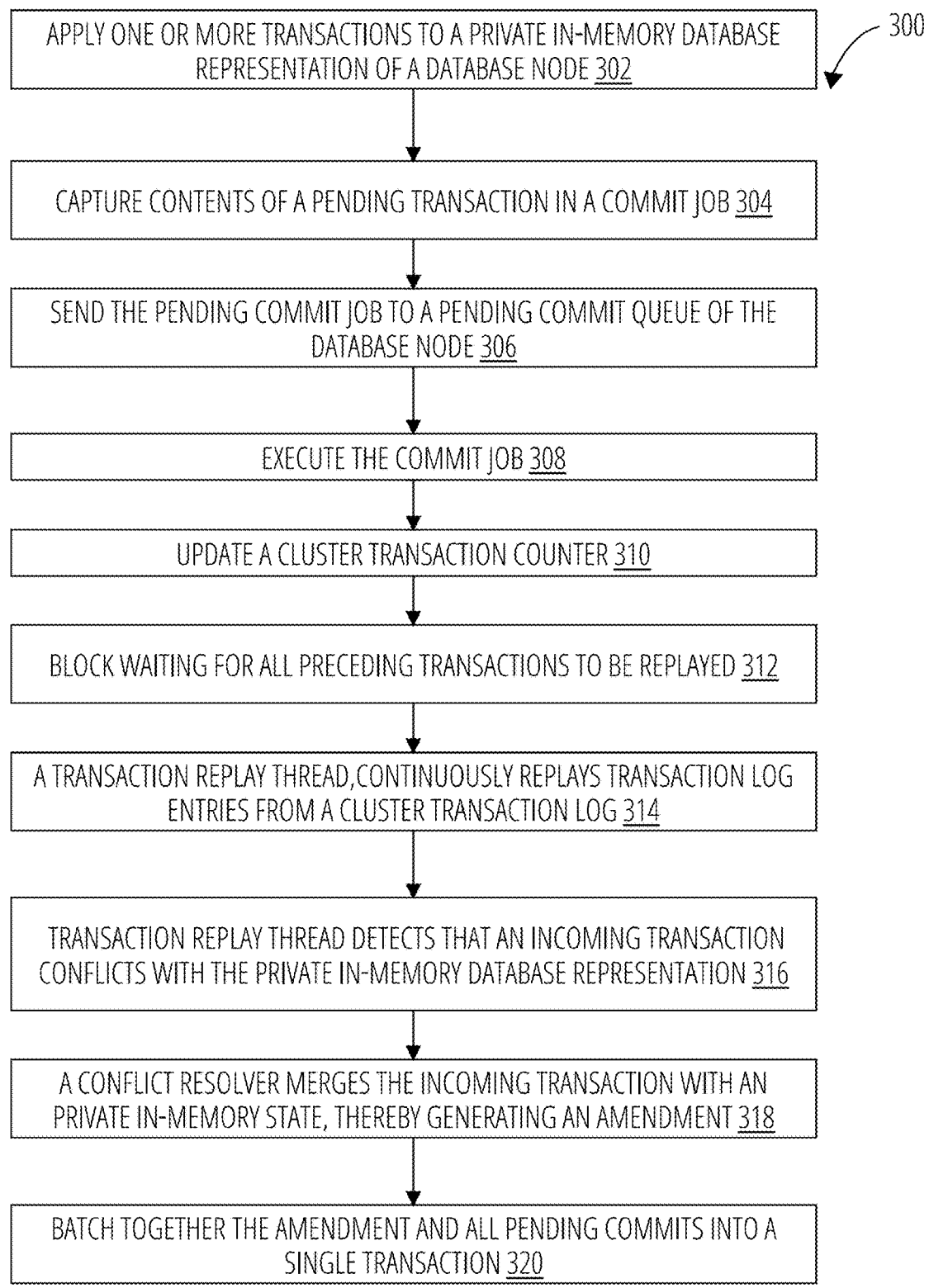
FIG. 3 illustrates a block diagram in accordance with one embodiment.

FIG. 3 illustrates a block diagram 300 in accordance with one embodiment.

The database node, cluster transaction log, and a cluster transaction counter may be combined as follows. Each node applies one or more transactions immediately to its private in-memory database representation, and replies to a client that the transaction is "committed".

The contents of each transaction are then captured in a commit job, which goes into the node's pending commit queue. Before the commit job completes execution, the transaction is known as a "pending transaction".

When a commit job begins execution, it increments the cluster transaction counter, and blocks waiting for all preceding transactions to be replayed.

The transaction replay thread continuously replays transactions logs from the cluster transaction "Replay" means that it identifies the incoming transactions that originated from other database nodes and applies them to the current database node.

When the transaction replay thread detects that an incoming transaction conflicts with the private in-memory database, it uses the Conflict Resolver to merge the incoming transaction with the private in-memory state. This is called an "amendment."

Conflicts are detected using the node's private sequence map. The amendment and all of the node's pending commits are batched together into a single transaction. The Conflict Resolver enables merging of conflicting data changes according to accepted rules for resolving conflicts. This means that conflicting transactions are accepted, and are not rolled back or aborted.

From a client's perspective, write transactions can commit as fast as the non-cluster database since they don't block waiting for communication with external services or other database nodes.

FIG. 3 is described further as follows. At block 302, one or more transactions are applied to a private in-memory database representation of a database node. See, for example, in-memory database representation 204 in FIG. 2. As part of applying each transaction to the node's in-memory database, a corresponding commit job is created and appended to the node's pending commit queue (block 304 and block 306). The commit job captures the content of the transaction. At block 308, the commit job is executed. At block 310, a cluster transaction counter is incremented. At block 312, the execution of the commit job is blocked while waiting for all preceding transactions to be replayed. At block 314, in parallel with blocks 302-312, a transaction replay thread continuously replays incoming entries from the cluster transaction log. At block 316, the transaction replay thread detects whether an incoming transaction conflicts with the private in-memory database representation. When such a conflict exists, at block 318, a Conflict Resolver merges the incoming transaction with an private in-memory state, thereby generating an amendment. At block 320, the amendment and all pending commits are batched into a single transaction.

Terminology

"Pending transactions" are transactions that have been applied to the originating node's in-memory database representation, but have not yet been written to the cluster transaction log. Their commit jobs are queued in a pending commit queue. Each pending transaction is numbered by a Node Sequence Number (NSN). The NSN can be used for sequencing pending transactions on a particular node, but is not portable to a different node. That is, different nodes may each have pending transactions with identical NSNs. The NSN serves to monitor the progress of pending transactions through the pending commit queue. A pending transaction does not receive a transaction ID (or an ETxn value) until its commit job executes. Finally, a pending transaction on one node cannot be observed on any other node.

Unlike pending transactions, "committed transactions" have been written to the cluster transaction log, which is transmitted to every database node in the cluster. Thus, all committed transactions cannot be modified. Furthermore, all transactions applied by the transaction replay thread (aka "replay transactions") are, by definition, committed transactions.

Example of Coordinating Replay and Commit where there is No Conflict.

FIG. 4-FIG. 8 illustrate an example of coordinating replay and commit of pending transactions where there is no conflict between pending and replayed transactions.

Where there are no conflicts, in some embodiments, the steps for committing a new transaction can comprise: a first phase of committing one or more transactions to a queue; a second phase of obtaining an ETxn and waiting; a third phase of replaying; and a fourth phase of committing replayed transactions.

Figure 4:
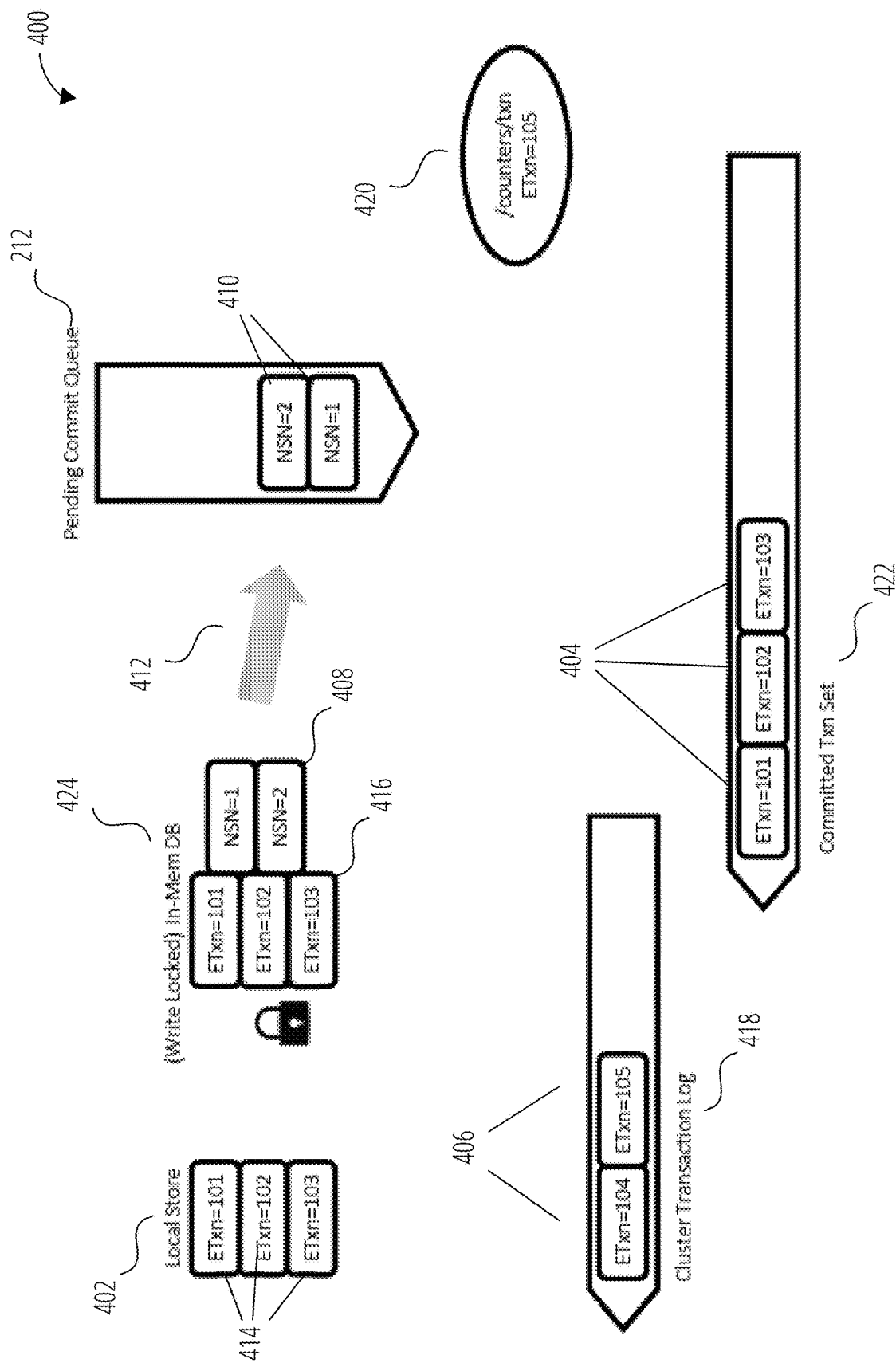
FIG. 4 illustrates a queue commit process in accordance with one embodiment.

The first phase can involve the following: applying the new transaction to the in-memory database representation 424 and queuing its commit job in the Pending Commit Queue 212. FIG. 4 provides a more detailed illustration of this phase. FIG. 4 illustrates a queue commit process 400 of pending transactions in accordance with one embodiment.

A local store 402 contains a set of transactions. A local store 402 is private persistent storage for a database node. It stores the persistent database representation for a database node. As part of replaying a transaction, the persistent database representation is kept consistent with the in-memory database representation.

A set of committed transactions 416 and pending transactions 408 have been applied to the in-memory database representation 424. The commit jobs 410 for the pending transactions 408 are placed in the Pending Commit Queue 212 (arrow 412). A Committed Txn Set 422 contains a record of the ids (404) of the Pending Commit Queue 212 that have been applied to the in-memory database representation 424. Similarly, the Cluster Transaction Log 418 contains a set of transactions 406. The Cluster Transaction Log 418 is transmitted to all database nodes. Such transmission can be carried out by a distributed event logging system, such as, but not limited to Kafka®. A cluster transaction counter 420 keeps track of the most recently allocated ETxn (allocating an ETxn reserves a position in the Cluster Transaction Log 418 for a pending transaction).

In FIG. 4, the local store 402 stores three committed transactions 414: ETxn=101, ETxn=102, and ETxn=103. The in-memory database representations 424 contains three committed transactions (416): ETxn=101, ETxn=202, and ETxn=103; and two pending transactions 408: NSN=1 and NSN=2. The commit jobs 410 for these two pending transactions 408 are placed in the Pending Commit Queue 212. The cluster transaction counter 420 keeps track of the most recently allocated ETxn, which is ETxn=105. The Committed Txn Set 422 contains three committed transactions 404: ETxn=101, ETxn=202, and ETxn=103. Finally, the Cluster Transaction Log 418 contains two committed transactions which have not yet been applied by the transaction replay thread 404: ETxn=104 and ETxn=105. The Cluster Transaction Log 418 contains all committed transactions, but they are not all shown in the diagram (only committed transactions identified by ETxn=204 and ETxn=105 are shown).

Figure 5:
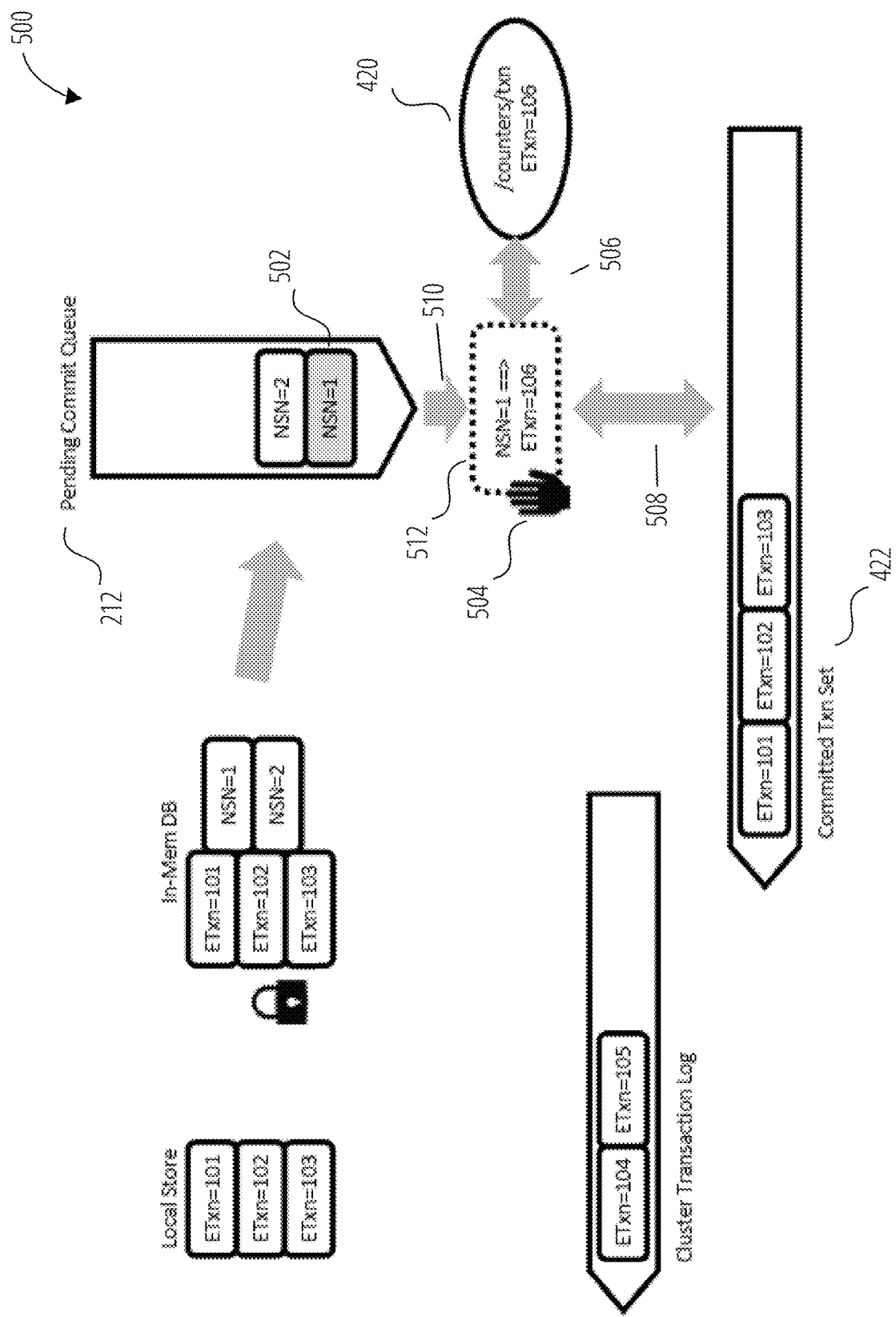
FIG. 5 illustrates initial processing of a pending transaction in accordance with one embodiment.

The second phase can be summarized as follows. When the commit job executes: it obtains an ETxn from the cluster transaction counter 420; and it checks a Committed Txn Set 422. It blocks until all the preceding ETxns have been added to the Committed Txn Set 422. FIG. 5 provides a more detailed illustration of this phase. FIG. 5 illustrates initial processing 500 of a pending transaction's commit job in accordance with one embodiment.

In FIG. 5, a commit job 512 for pending transaction NSN=1 (item 502) de-queues (arrow 510) from the Pending Commit Queue 212. When the commit job 512 executes, it obtains an ETxn from the cluster transaction counter 420 for pending transaction 502. The commit job 512 consults the cluster transaction counter 420 (arrow 506) to obtain an ETxn. Since the most recently allocated ETxn was ETxn=105 (see cluster transaction counter 420 in FIG. 4), the pending transaction 502 is allocated the next ETxn (ETxn=106), and the cluster transaction counter 420 is updated accordingly to indicate that the most recently allocated ETxn is ETxn=106.

The commit job 512 then checks (arrow 508) the Committed Txn Set 422, and blocks (item 504) until all the preceding ETxns have been flushed. In FIG. 5, the commit job 512 ascertains that the Committed Txn Set 422 has ETxn=103 as the highest committed transaction; committed transactions with ETxn=204 and ETxn=105 must be flushed in the Committed Txn Set 422 in sequence prior to pending transaction 502 which has ETxn=106. Thus, the commit job 512 blocks (504) further processing of pending transaction 502, and waits.

Figure 6:
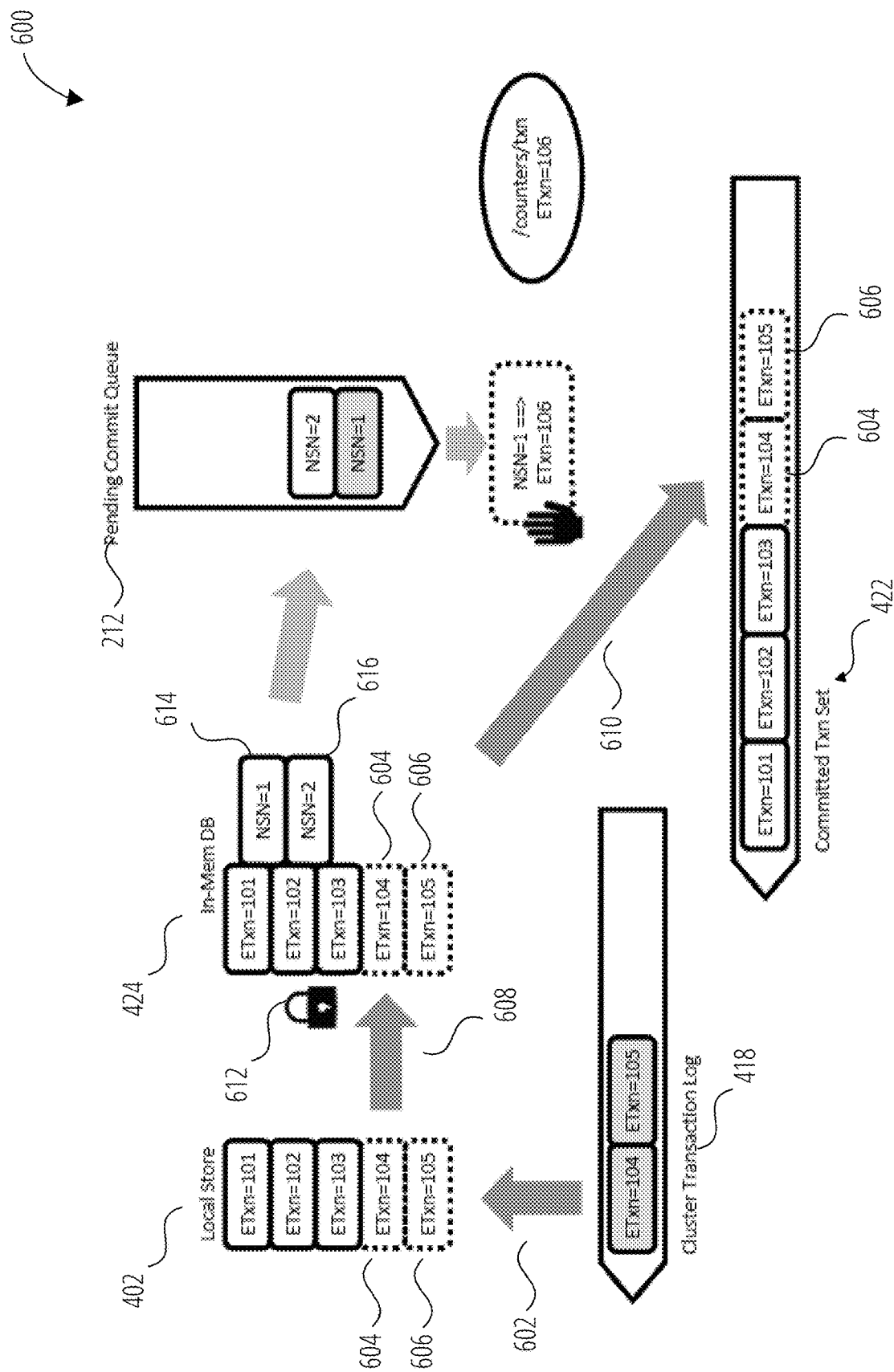
FIG. 6 illustrates a replay process in accordance with one embodiment.

The third phase can be summarized as follows. While the commit job is blocked the following events occur: a transaction replay thread consumes a replay transaction from the Cluster Transaction Log 418. The replay transaction is committed to the Local store 402. While holding the Replay write lock 612, the replay transaction is applied to the in-memory database representation 424; and the replay transaction is appended to the Committed Txn Set 422. FIG. 6 provides a more detailed illustration of this phase. FIG. 6 illustrates a replay process 600 in accordance with one embodiment.

While the commit job is blocked (item 504 in FIG. 5), a transaction replay thread consumes a replay transaction from the Cluster Transaction Log 418. The replay transaction is then committed to the Local store 402. The replay transaction is applied to the in-memory database representation 424. Since there is no conflict, the replay transaction is then appended to the Committed Txn Set 422.

In FIG. 6, there are two transactions (ETxn=204 and ETxn=105) in Cluster Transaction Log 418 which are part of the replay transaction thread. That is, other nodes have created transactions (ETxn=204 and ETxn=105) that are registered in the Cluster Transaction Log 418. These are committed (arrow 602) to local store 402, as indicated by 604 and 606. The two transactions 604 and 606 are applied (arrow 608) to the in-memory database representation 424. Since there is no conflict between each of the replay transactions (604, 606) and the pending transactions 614 and 616, each of the replay transactions (604, 606) are then appended (arrow 610) to the Committed Txn Set 422.

Figure 7:
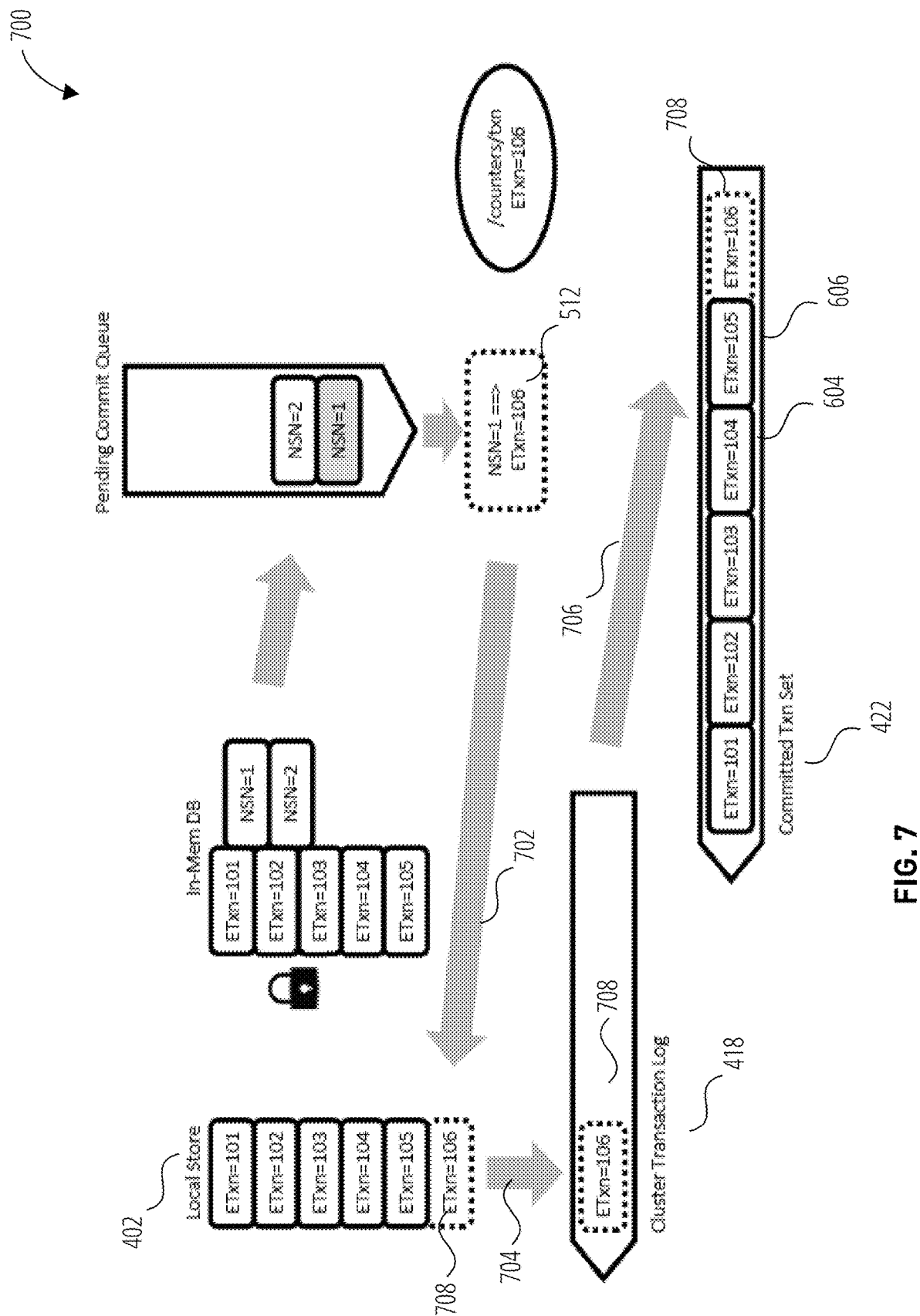
FIG. 7 illustrates a commit process in accordance with one embodiment.

The fourth phase can be summarized as follows. When the commit job 512 unblocks (which occurs when all preceding transactions have flushed), the new transaction is committed to the local store 402. The new transaction is then committed to the Cluster Transaction Log 418; and the new transaction is appended to the Committed Txn Set 422. FIG. 7 provides a more detailed illustration of this phase. FIG. 7 illustrates a commit process 700 in accordance with one embodiment.

Once the preceding transactions have flushed in Committed Txn Set 422, the block on the commit job 512 is released. In FIG. 7, transactions with ETxn=204 and ETxn=105 (items 604 and 606, respectively) are now in Committed Txn Set 422. The new transaction 512 (with ETxn=212), once released, is then committed (arrow 702) to the local store 402, as indicated by 708. The new transaction 708 is then committed (arrow 704) to the Cluster Transaction Log 418. The new transaction 708 is also appended (arrow 706) to the 422.

Figure 8:
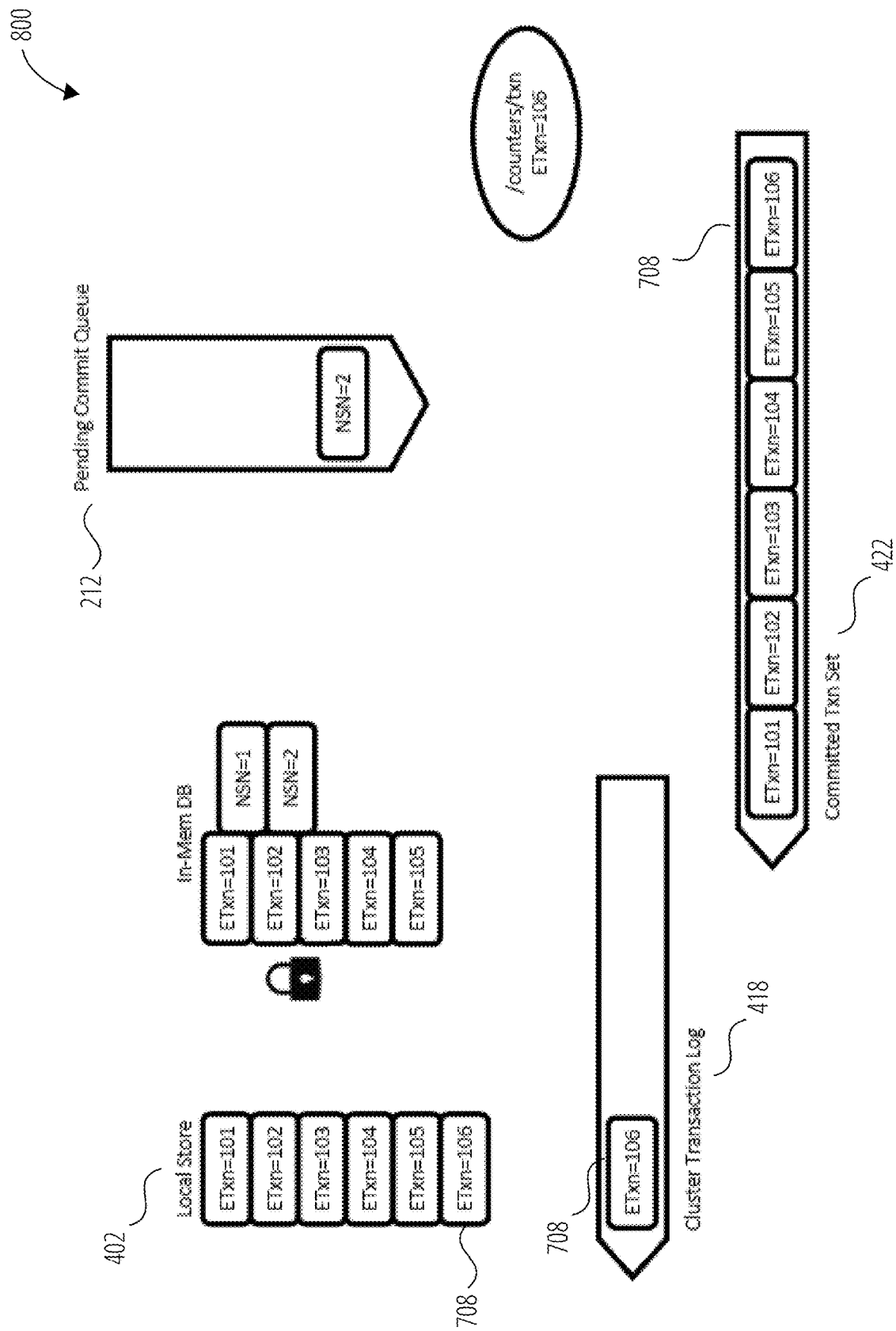
FIG. 8 illustrates completion of a commit job in accordance with one embodiment

FIG. 8 illustrates completion 800 of a commit job in accordance with one embodiment. Following the process in FIG. 7, the commit job is now complete. It is in local store 402 (item 708); in the Cluster Transaction Log 418 (item 708) and in Pending Commit Queue 212 (item 708). The commit job has also been de-queued from Pending Commit Queue 212.

Figure 9:
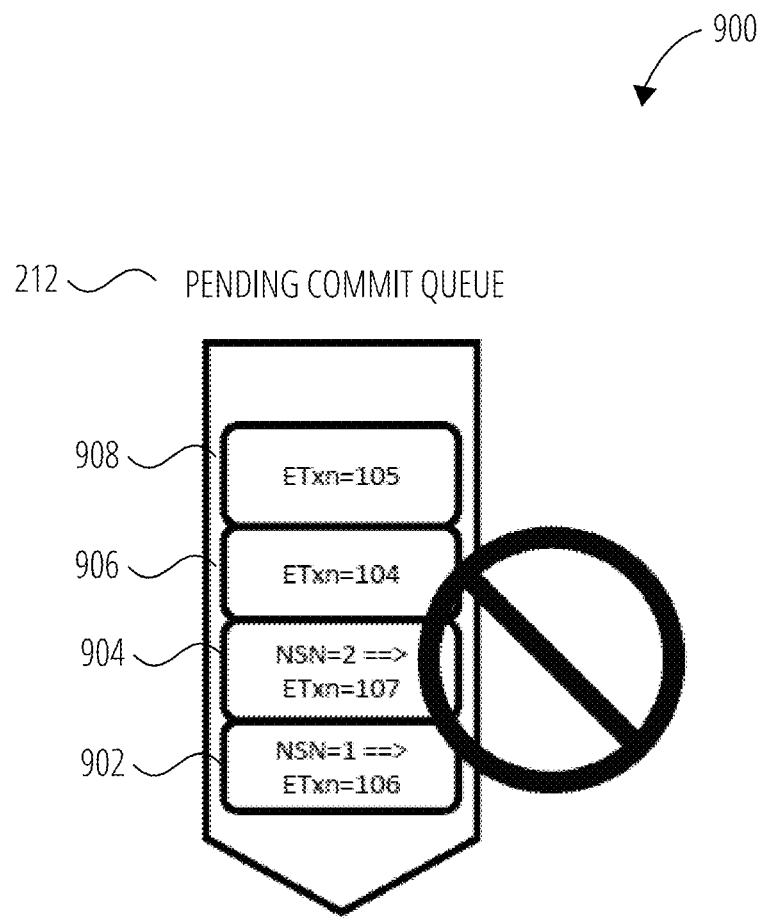
FIG. 9 illustrates a rule for a pending commit queue in accordance with one embodiment.

FIG. 9 illustrates a rule 900 for a Pending Commit Queue 212 in accordance with one embodiment. Replay and pending transactions are not mixed in the Pending Commit Queue 212. This is because the ordering is not sequential in Pending Commit Queue 212. It is possible that locally originating pending transactions may be in queue before preceding replay transactions. That is, replay transactions would be interleaved with pending transactions in the Pending Commit Queue 212, and the jobs in the queue would be out of order according to their respective ETxn values.

This is shown in FIG. 9, where pending transactions ETxn=212 (item 902) and ETxn=107 (item 904) are before replay transaction ETxn=104 (item 906) and ETxn=105 (item 908). The actual order of the transactions is ETxn=204, ETxn=105, ETxn=212, ETxn=107. However, this order is not maintained in Pending Commit Queue 212. That is, preceding replay transactions and pending transactions are independent of each other, and should thus not be combined in Pending Commit Queue 212.

With reference to the examples shown in FIG. 6, each of the replay transactions (ETxn=204 and ETxn=105) is first written to local store 402 from Cluster Transaction Log 418, then write-locked to in-memory database representation 424, and then appended to Committed Txn Set 422, while completely bypassing Pending Commit Queue 212. However, as shown in FIG. 4, FIG. 4 and FIG. 8, the originated transactions (NSN=1, NSN=2) first went through the Pending Commit Queue 212 before being appended to the Pending Commit Queue 212.

Example of Coordinating Replay and Commit Where There is a Conflict.

FIG. 10-FIG. 14 illustrate an example of coordinating replay and commit of pending transactions where there is a conflict between pending and replayed transactions.

A conflict may be detected while the commit job is blocked waiting for preceding replay transactions to be flushed (see FIG. 6 and description thereof, above). In the case of a conflict, the first two phases described in FIG. 4 and FIG. 5 apply; namely a first phase of committing one or more transactions to a queue (see FIG. 4); and a second phase of obtaining an ETxn and waiting (see FIG. 5).

Figure 10:
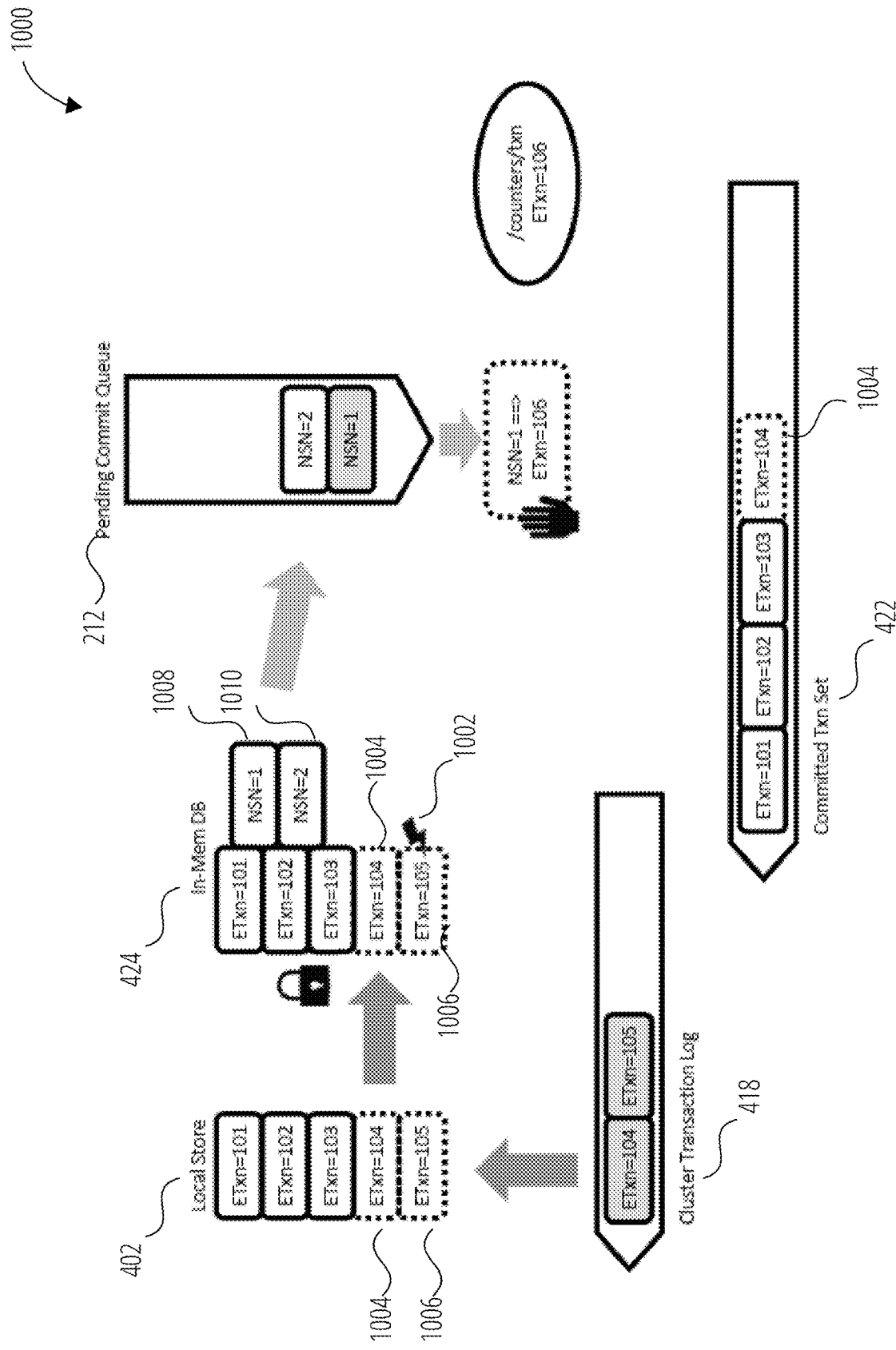
FIG. 10 illustrates a replay conflict in accordance with one embodiment.

However, the third phase comprising a replay process differs slightly when there is a conflict, as shown in FIG. 10, which illustrates a replay conflict 1000 in accordance with one embodiment. In both situations (with and without conflict), while the commit job is blocked, a transaction replay thread consumes a replay transaction from the Cluster Transaction Log 418. Furthermore, the replay transaction is committed to the Local store 402.

In FIG. 10, replay transaction 1004 (ETxn=204) is pulled from the replay thread in Cluster Transaction Log 418 and is written to the local store 402. It is then applied to in-memory database representation 424. Since replay transaction 1004 has no conflict with the pending transactions 1008 (NSN=1) and 1010 (NSN=2), it is flushed and placed in Committed Txn Set 422.

Similarly, the replay thread pulls transaction 1006 (ETxn=105) from the Cluster Transaction Log 418, writes it to the local store 402, and then tries to apply it to in-memory database representation 424. However, a conflict 1002 between replay transaction 1006 with the in-memory pending transactions 1008 (NSN=1) and 1010 (NSN=2) is detected. Such a conflict arises because pending transactions are not visible to whichever node created transaction 1006. It so happens that replay transaction 1006 and the pending transactions 1008 and 1010 do not match up.

Figure 11:
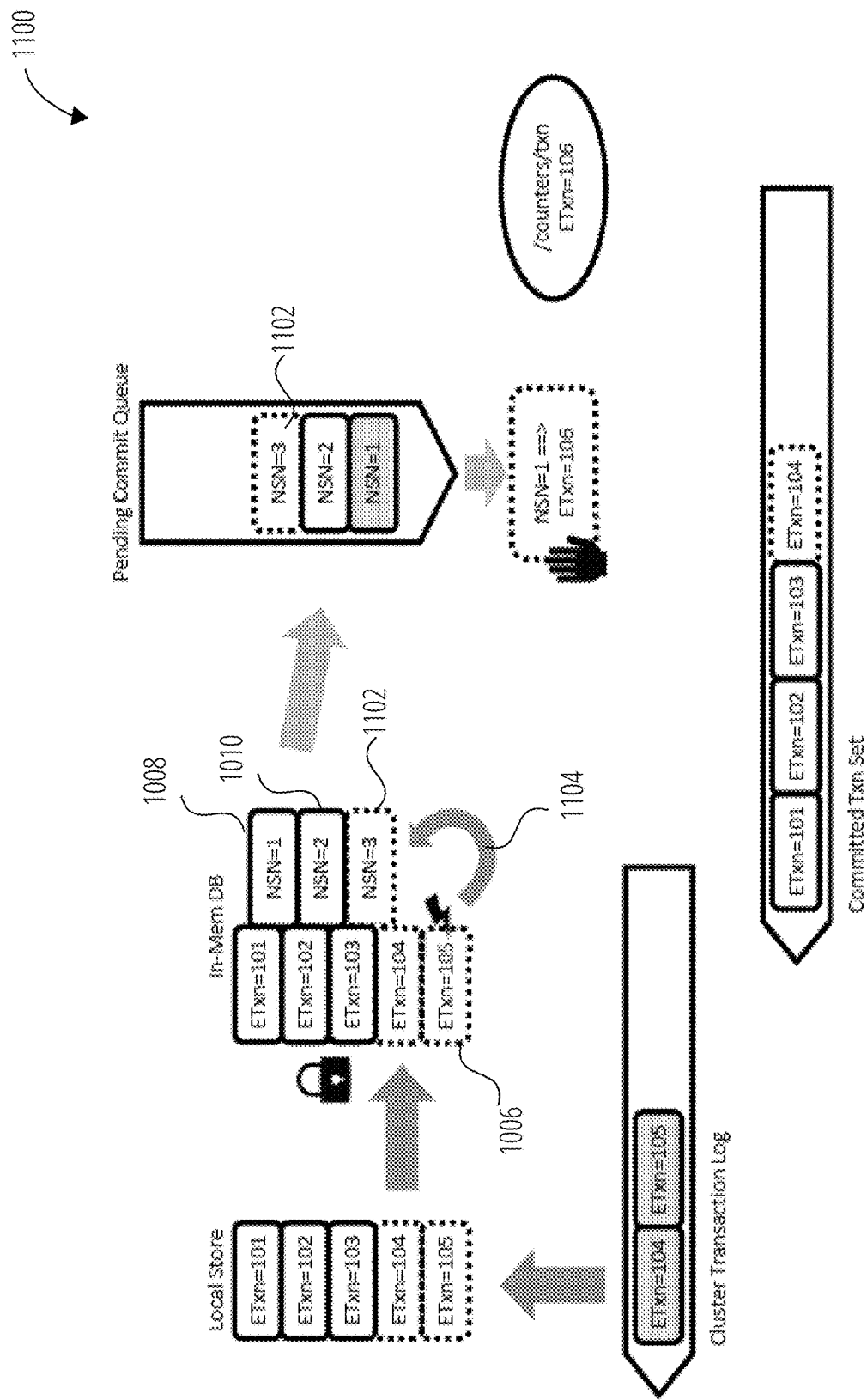
FIG. 11 illustrates an amend process in accordance with one embodiment.

The conflict in-memory is resolved using a Conflict Resolver, which generates an amendment. FIG. 11 illustrates an amend process 1100 in accordance with one embodiment. The Conflict Resolver (not shown) generates (arrow 1104) a number of changes that merge the incoming committed state (that is, replay transaction 1006) with the pending states 9 That is, 1008 and 1010). This generates a new meta-transaction 1102 (NSN=3), or "amendment", which is placed into the Pending Commit Queue 212.

Figure 12:
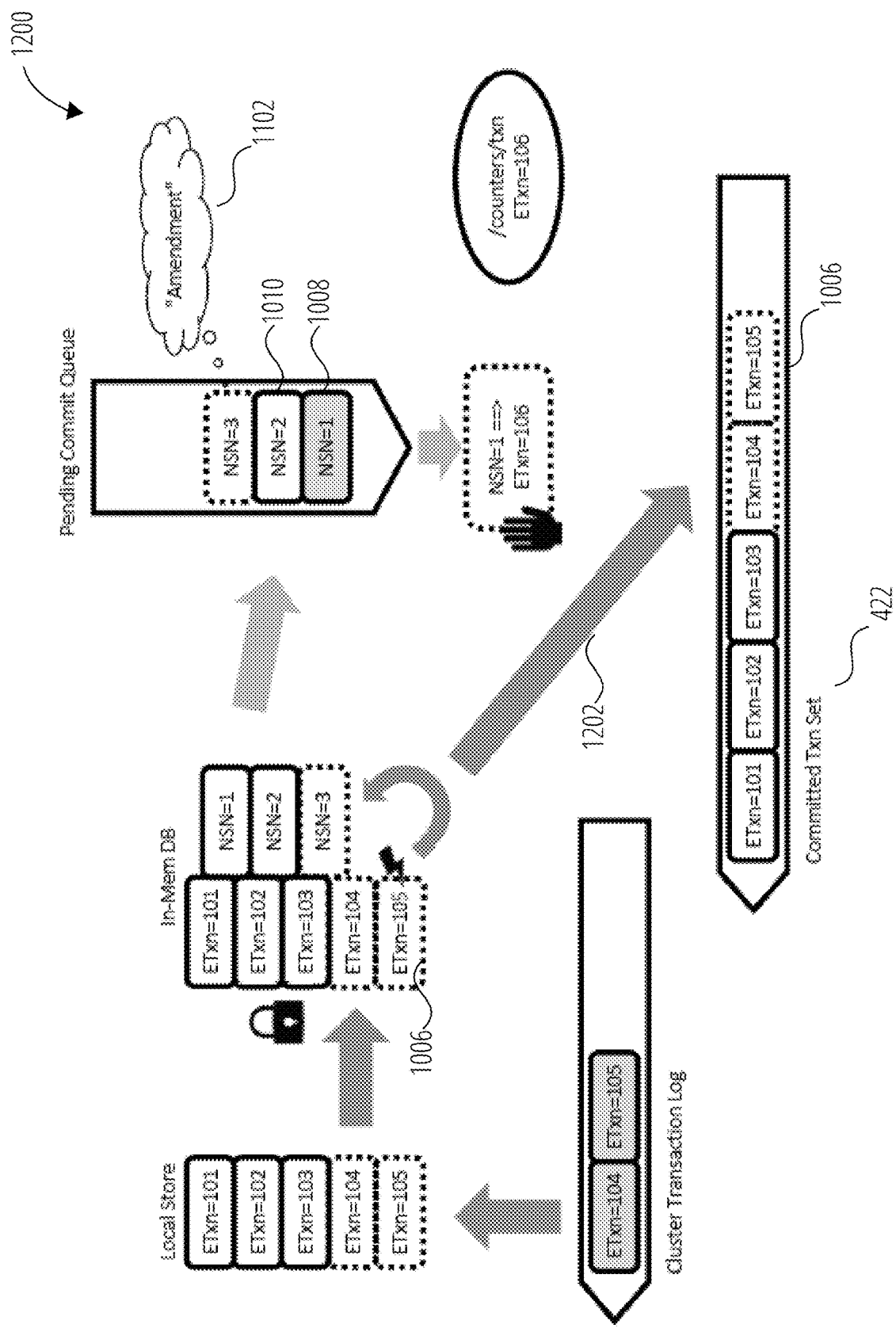
FIG. 12 illustrates a process to resolve a conflict and finish a replay, in accordance with one embodiment.

FIG. 12 illustrates a process 1200 to resolve a conflict and finish a replay, in accordance with one embodiment.

Figure 13:
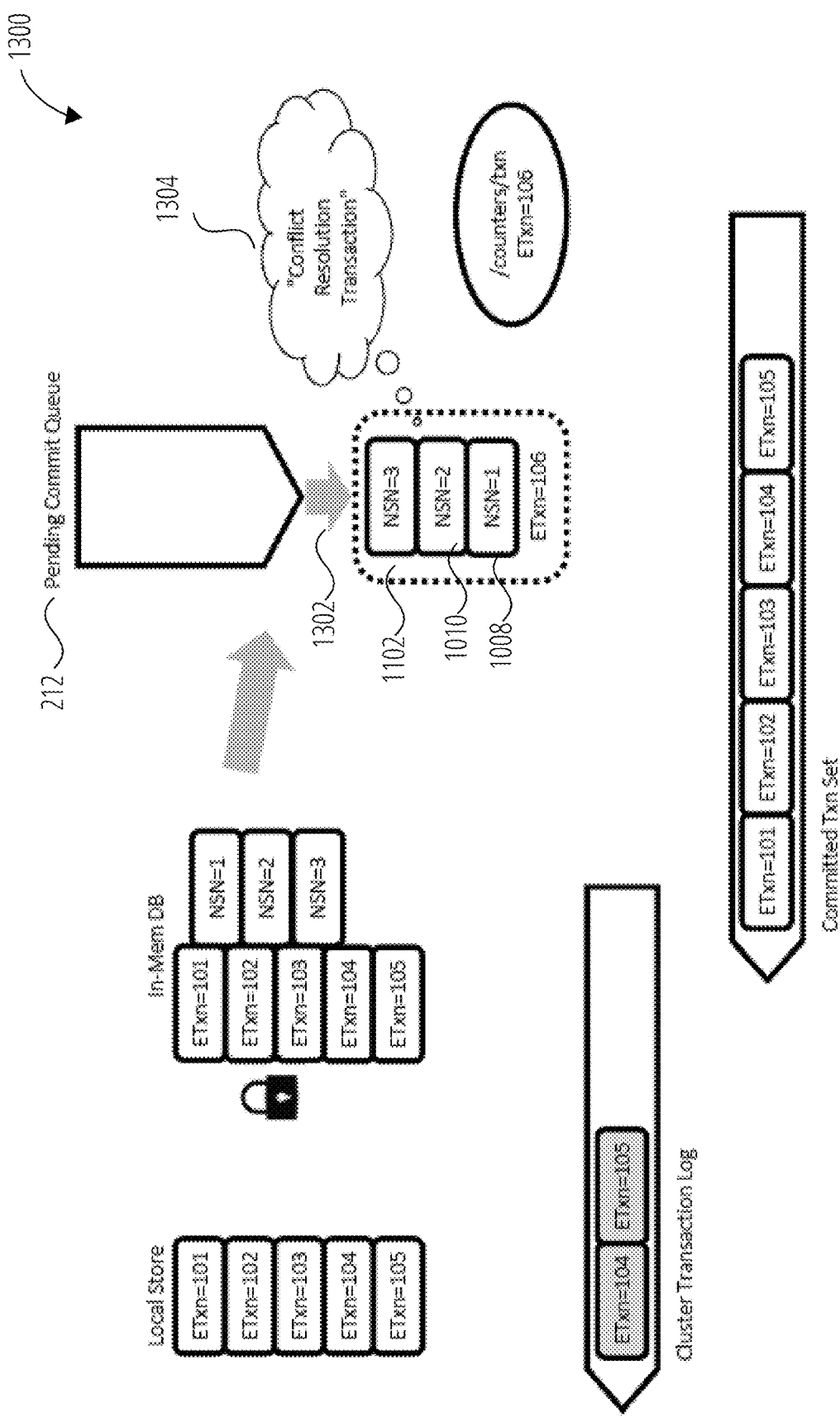
FIG. 13 illustrates a process to commit a conflict resolution transaction, in accordance with one embodiment.

The pending transactions 1008 and 1010 are then merged in the Pending Commit Queue 212, along with the amendment 1102, into a single conflict resolution transaction (see FIG. 13). Since the write lock is held, no new transactions can be concurrently generated or added to the Pending Commit Queue 212. Once the amendment 1102 is queued into the Pending Commit Queue 212, the replay transaction 1006 is flushed and appended (arrow 1202) to Pending Commit Queue 212.

One reason why all pending transactions are merged with the amendment is that the conflict could have been introduced into the in-memory database by any of the pending transactions, not just the most recent. The amendment must be committed in the same transaction as the conflicting pending transaction, so that the committed transaction log only contains consistent atomic transactions. However, an amendment cannot be inserted before pre-existing pending transactions. Since the amendment is generated based on the database state that includes all of the pending transactions, it is difficult to ensure the amendment would be correct if applied to an in-memory database that did not include all of those pending transactions. If the conflict was introduced in the most recent pending transaction, the amendment could be theoretically merged with only that pending transaction, rather than the whole queue. However, it is difficult to trace from a conflict to its originating transaction.

FIG. 13 illustrates a process 1300 to commit a conflict resolution transaction, in accordance with one embodiment. The fourth phase comprising a commit process, differs slightly when there is a conflict. When the commit job unblocks (which occurs when all preceding transactions have flushed), the Pending Commit Queue 212 is drained (arrow 1302) of all the commit jobs in the conflict resolution transaction 1304. Now that there is an amendment (1102) in the pending transactions, these transactions (1008, 1010, 1102) no longer satisfy ACID properties. That is, each transaction is no longer atomic on its own, Each transaction cannot be applied on its own, as is, because of the previous conflict. Thus, the three meta-transactions are batched into one transaction, termed the conflict resolution transaction 1304. The conflict resolution transaction 1304 includes all of the pending transactions (1008 and 1010) plus the amendment (amendment 1102). Thus, the three transactions are treated as a singular transaction 1304.

Figure 14:
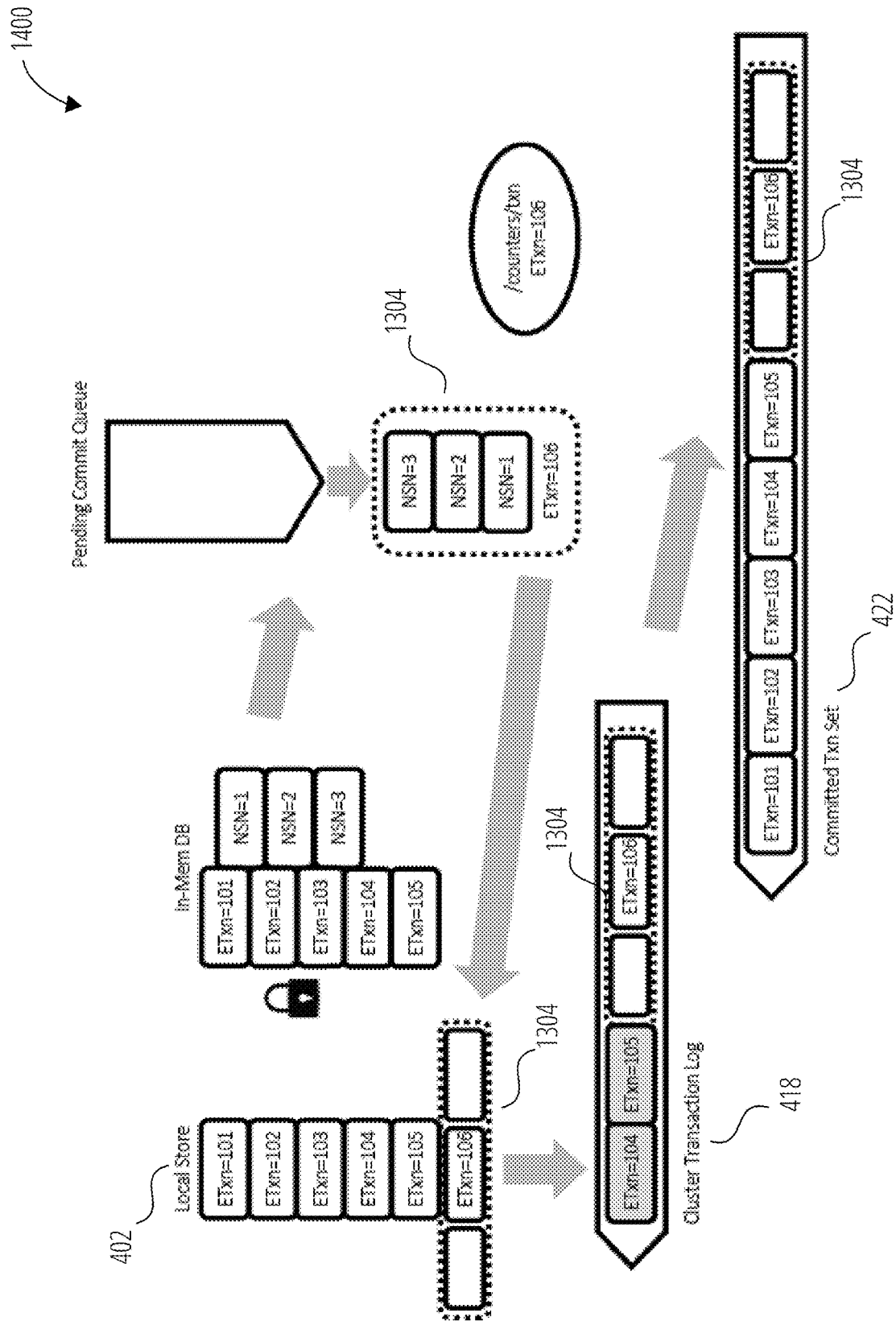
FIG. 14 illustrates an aspect of the subject matter in accordance with one embodiment.

FIG. 14 illustrates a process 1400 to commit a conflict resolution transaction, in accordance with one embodiment. The conflict resolution transaction 1304 is then committed to the local store 402. The conflict resolution transaction 1304 is also committed to the Cluster Transaction Log 418. The conflict resolution transaction is appended to the Committed Txn Set 422. In each of local store 402, Cluster Transaction Log 418 and Committed Txn Set 422, conflict resolution transaction 1304 has ETxn=106.

Nested Replay Conflict

After resolving a conflict, additional conflicts can be detected as additional preceding transactions are replayed. FIG. 15-FIG. 19 illustrate an example of coordinating replay and commit of pending transactions where there are multiple conflicts between pending and replayed transactions.

Figure 15:
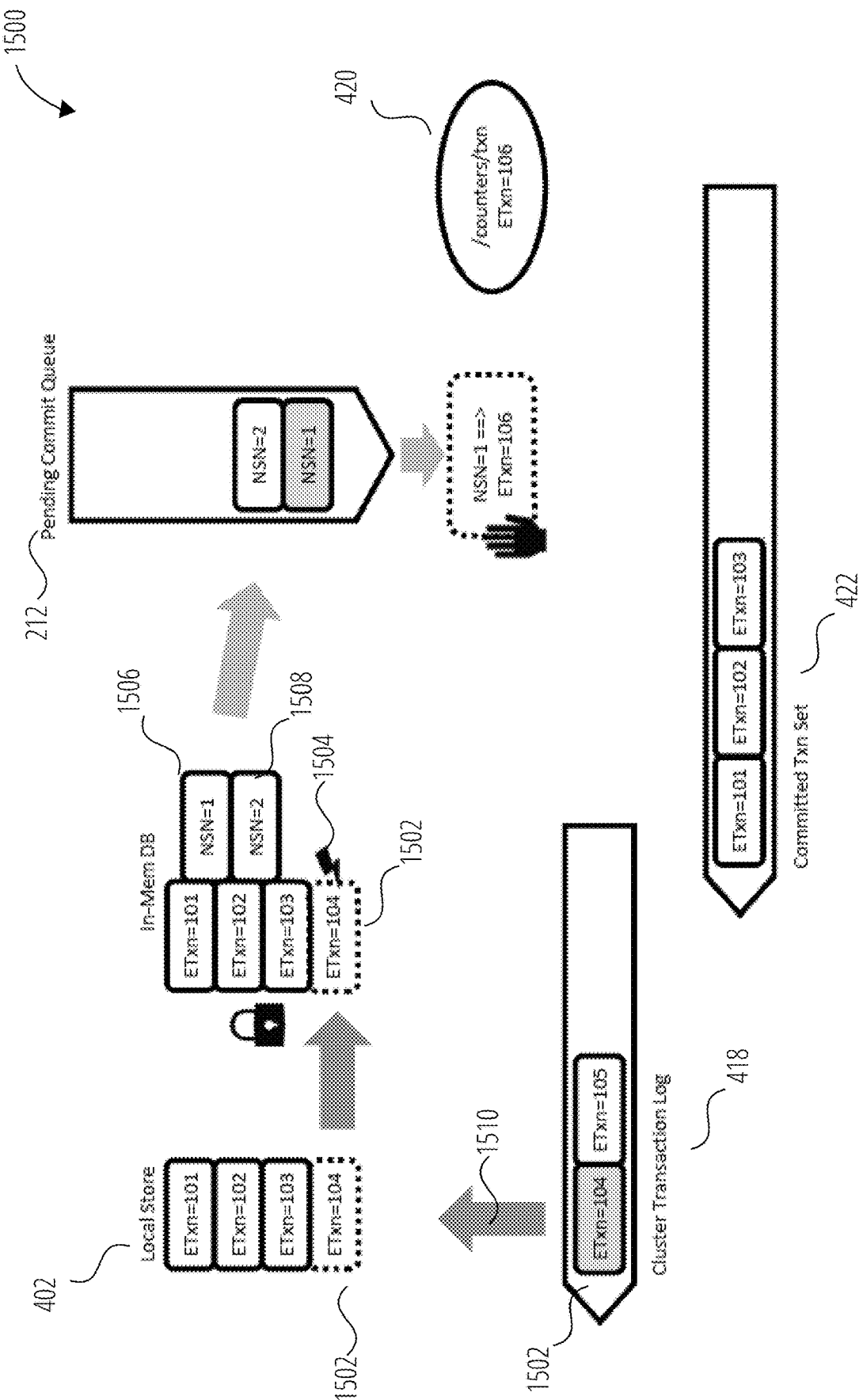
FIG. 15 illustrates a replay conflict in accordance with one embodiment.

FIG. 15 illustrates a replay conflict 1500 in accordance with one embodiment. In FIG. 15, a number of in-memory (or pending) transactions 1506 (NSN=1) and 1508 (NSN=2) have been created. These have been placed in the Pending Commit Queue 212. The cluster transaction counter 420 has reserved ETxn=106 for the commit job. The system is waiting replay transactions (ETxn=204) and ETxn=105 to come through to the Committed Txn Set 422.

Replay transaction 1502 (ETxn=204) is pulled (arrow 1510) from the replay thread in Cluster Transaction Log 418 and is written (arrow 1510) to the local store 402. An attempt to apply replay transaction 1502 to in-memory database representation 424 fails due to a conflict (shown by 1504) with the in-memory pending transactions 1506 (NSN=1) and 1508 (NSN=2). Such a conflict arises because pending transactions are not visible to whichever node created transaction 1502. It so happens that replay transaction 1502 and the pending transactions 1506 and 1508 do not match up.

Figure 16:
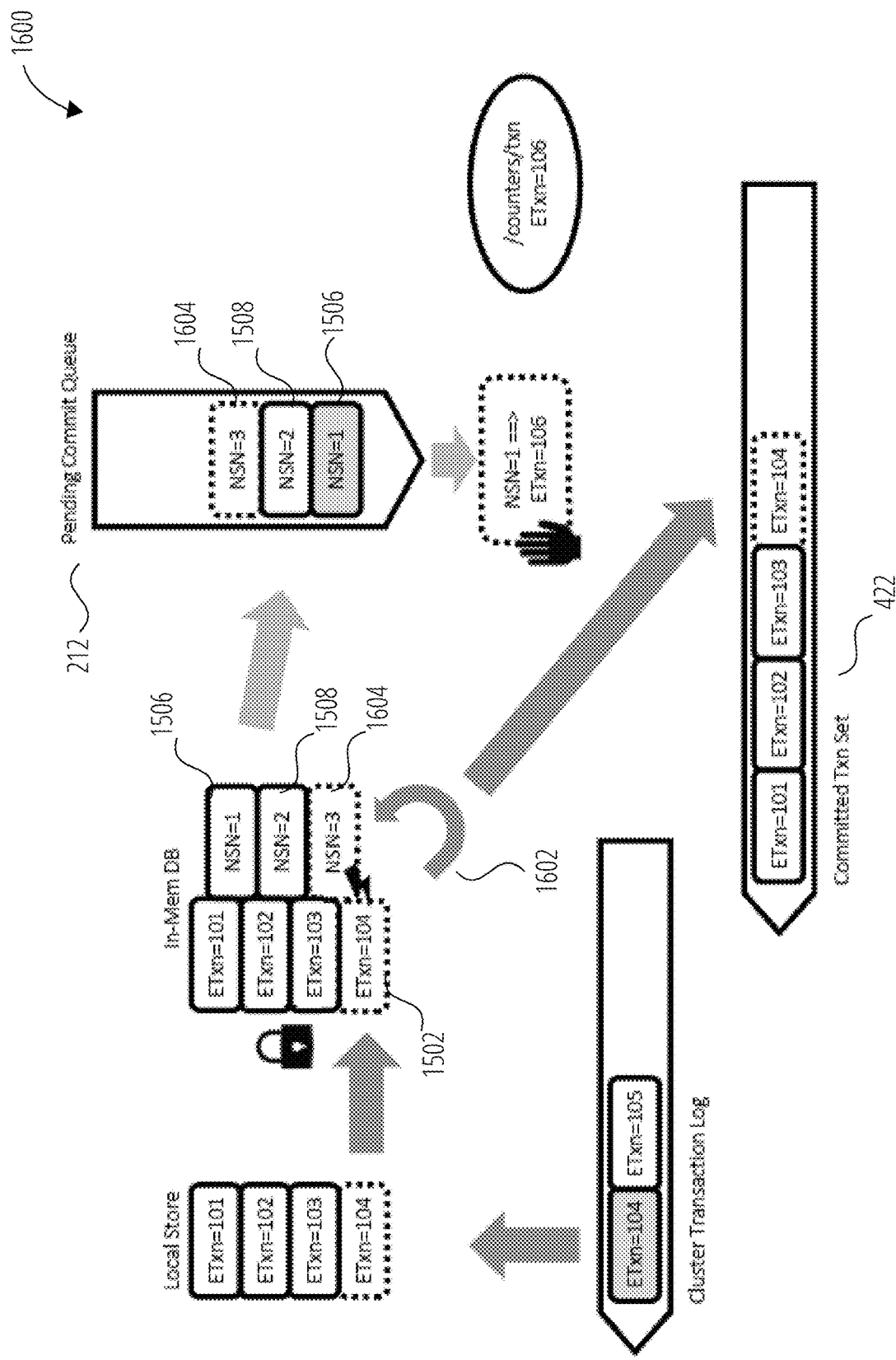
FIG. 16 illustrates a process to resolve a conflict and finish a replay, in accordance with one embodiment.

The conflict in-memory is resolved using a Conflict Resolver, which generates an amendment. FIG. 16 illustrates a process 1600 to resolve a conflict and finish a replay, in accordance with one embodiment. The Conflict Resolver (not shown) generates (arrow 1602) a number of changes that merge the incoming committed state (replay transaction 1502) with the pending states (1506 and 1508). This generates a new meta-transaction 1604 (NSN=3) which is placed into the Pending Commit Queue 212, along with pending transactions 1506 and 1508.

The pending transactions 1506 (NSN=1) and 1508 (NSN=2) are then merged in the Pending Commit Queue 212, along with the amendment 1604 (NSN=3). Since the write lock is held, no new transactions can be concurrently generated or added to the Pending Commit Queue 212. Once the amendment 1102 is queued into the Pending Commit Queue 212, the replay transaction 1502 is flushed and appended (arrow 1202) to Committed Txn Set 422. The system still waits to process the transaction with ETxn=206, since the preceding replay transaction with ETxn=105 has not yet been flushed to 422.

Figure 17:
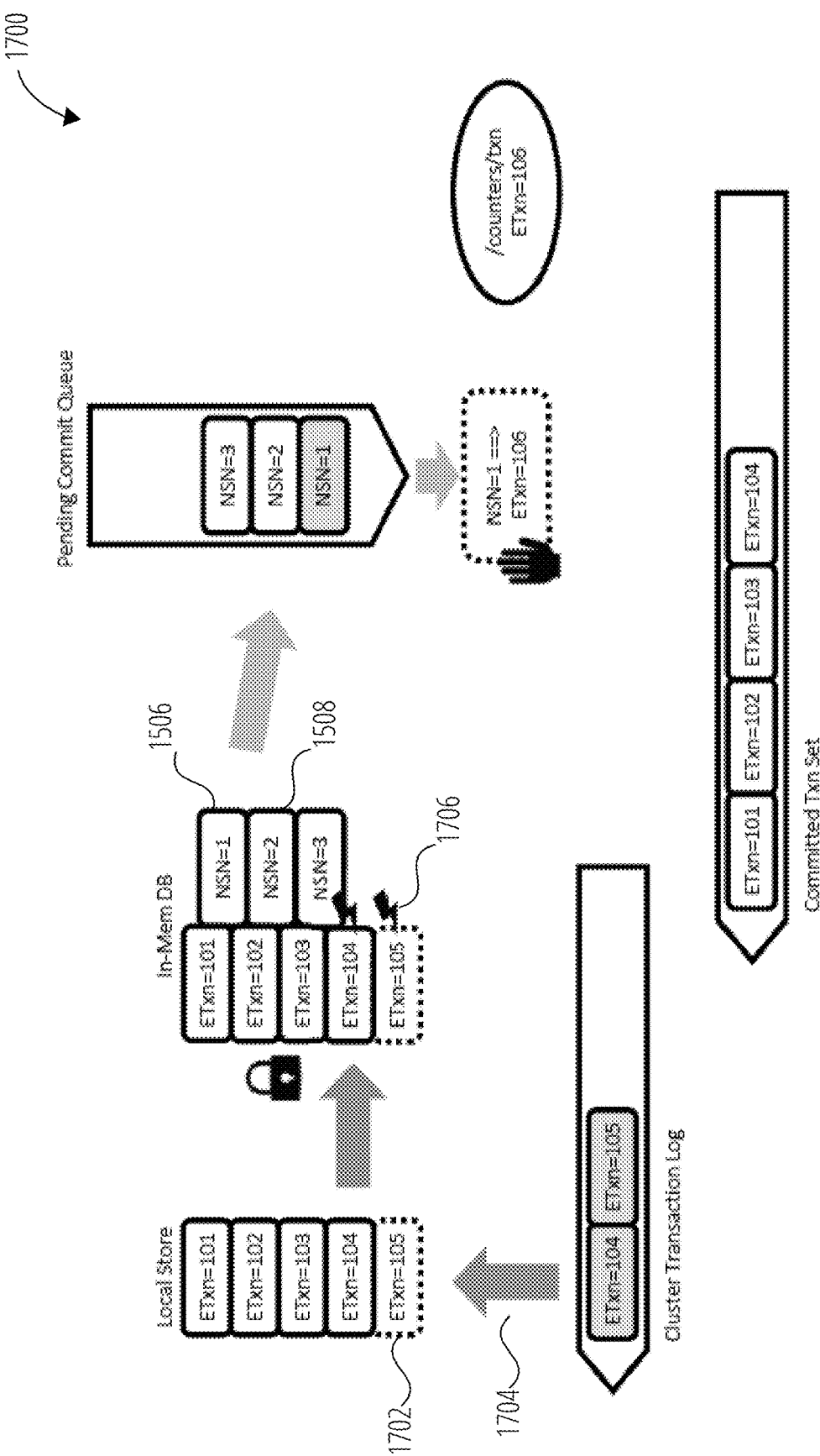
FIG. 17 illustrates a nested replay conflict, in accordance with one embodiment.

FIG. 17 illustrates a nested replay conflict 1700, in accordance with one embodiment.

In FIG. 17, replay transaction 1702 (ETxn=105) is pulled (arrow 1704) from the replay thread in Cluster Transaction Log 418 and is written (arrow 1704) to the local store 402. An attempt to apply replay transaction 1702 to in-memory database representation 424 fails due to another conflict (shown by 1706) with the in-memory pending transactions 1506 (NSN=1) and 1508 (NSN=2). Such a conflict arises because pending transactions are not visible to whichever node created transaction 1502. It so happens that replay transaction 1702 and the pending transactions 1506 and 1508 do not match up.

Figure 18:
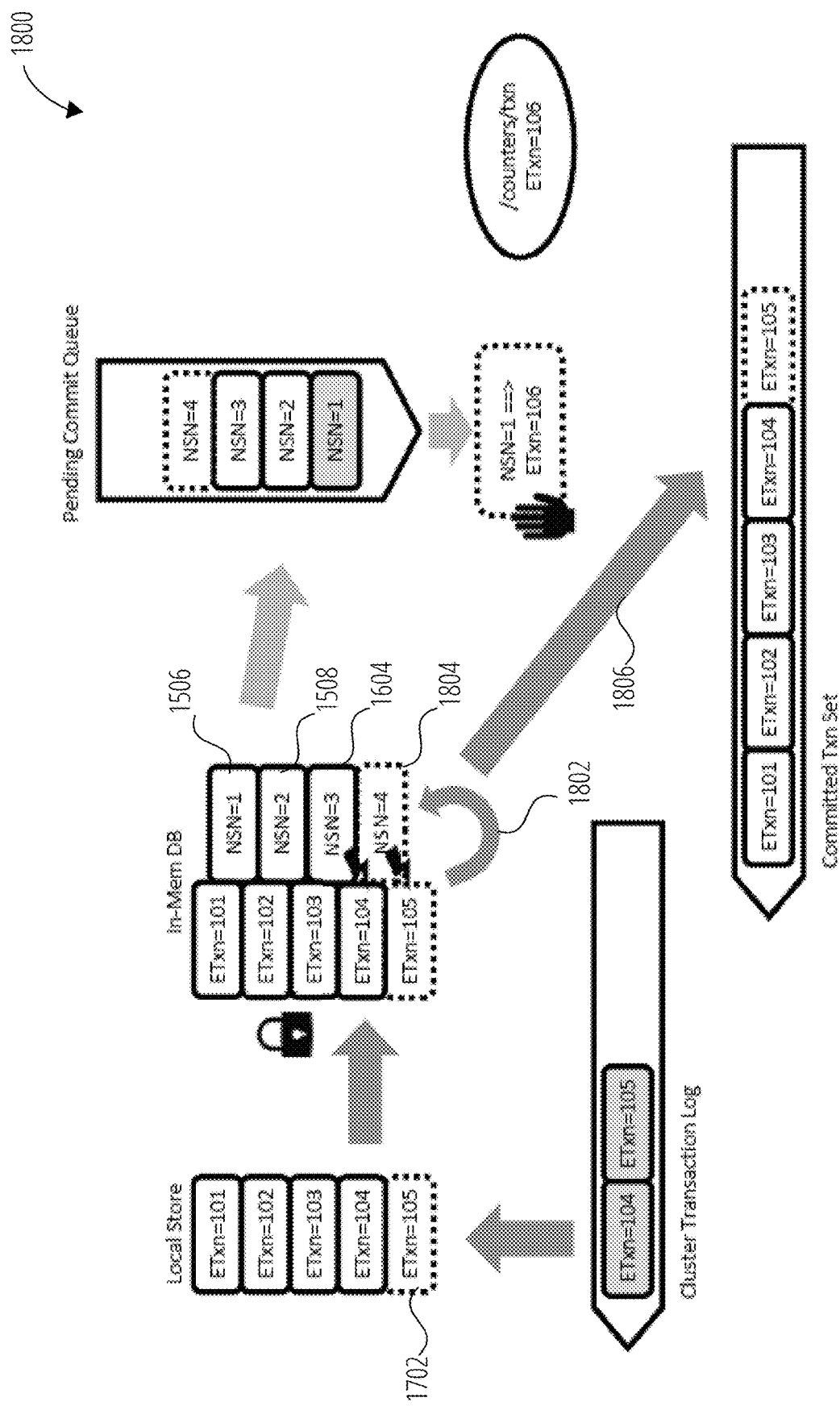
FIG. 18 illustrates a process to re-amend, in accordance with one embodiment.
Figure 19:
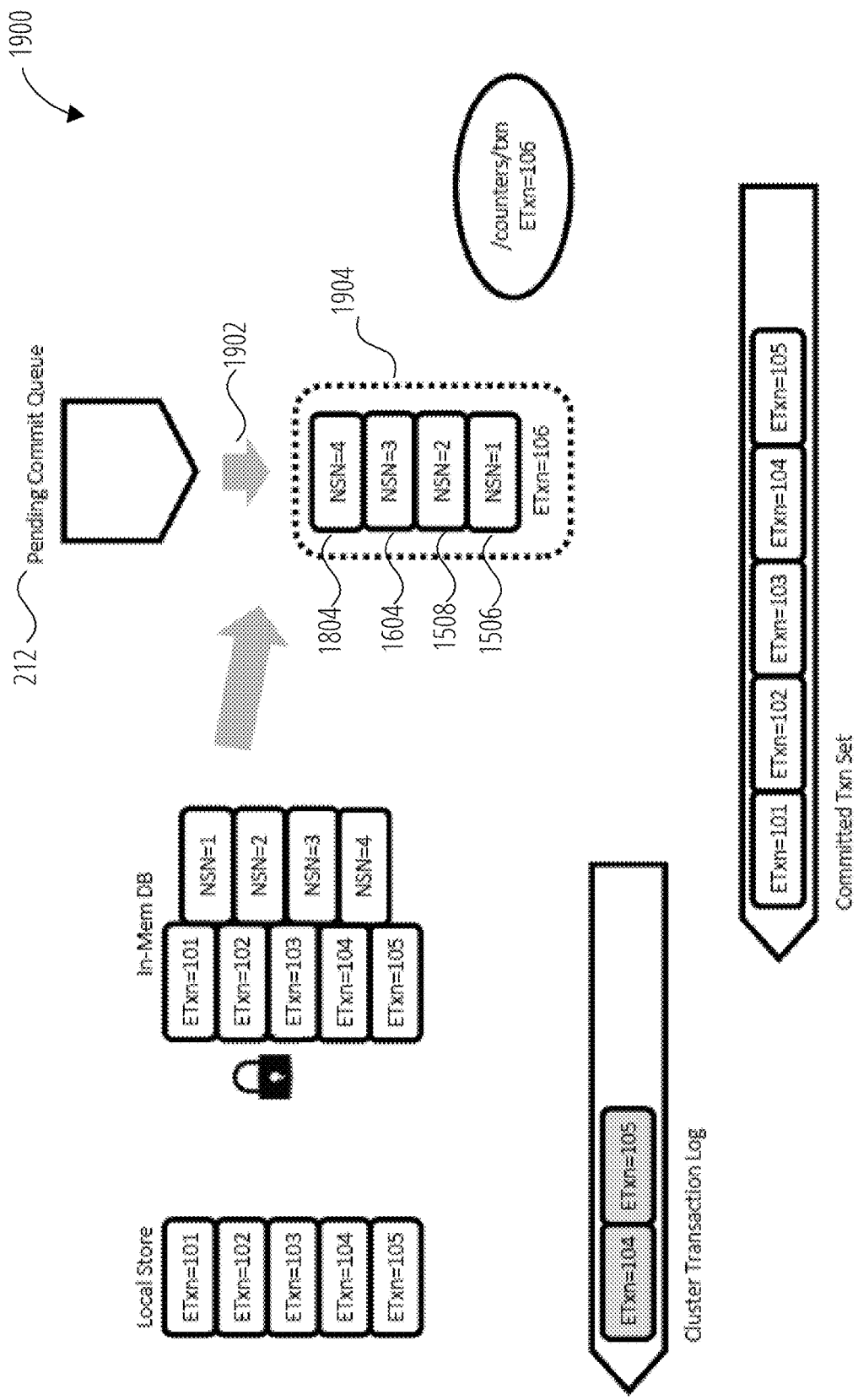
FIG. 19 illustrates a process to commit a nested conflict resolution transaction, in accordance with one embodiment.

The second conflict in-memory is resolved using a Conflict Resolver, which generates an amendment. FIG. 18 illustrates a process 1800 to re-amend, in accordance with one embodiment. The Conflict Resolver (not shown) generates (arrow 1802) a number of changes that merge the incoming committed state (replay transaction 1702) with all of the pending states (1506, 1508 and meta-transaction 1604). This generates a further new meta-transaction 1804, or amendment, (NSN=4) which is placed into the Pending Commit Queue 212, along with preceding pending transactions 1506 and 1508 and meta-transaction 1604.

The pending transactions 1506 (NSN=1) and 1508 (NSN=2) are then merged in the Pending Commit Queue 212, along with the amendment 1604 (NSN=3) and amendment 1804 (NSN=4). Since the write lock is held, no new transactions can be concurrently generated or added to the Pending Commit Queue 212. Once the amendment 1804 is queued into the Pending Commit Queue 212, the replay transaction 1702 is flushed and appended (arrow 1806) to Committed Txn Set 422.

The system is now ready to commit the conflict resolution transaction with ETxn=206. FIG. 18 illustrates a process 1900 to commit a nested conflict resolution transaction, in accordance with one embodiment. When the commit job unblocks (which occurs when all preceding transactions have flushed), the Pending Commit Queue 212 is drained (arrow 1902) of all the commit jobs in the conflict resolution transaction 1904. Now that there are two amendments (1604 and 1804) in the pending transactions, these transactions (1506, 1508, 1604 and 1804) no longer satisfy ACID properties. That is, each transaction is no longer atomic on its own, Each transaction cannot be applied on its own, as is, because of the previous conflict. Thus, the four meta-transactions are batched into one transaction, termed the conflict resolution transaction 1904. The conflict resolution transaction 1904 includes all of the pending transactions (1506 and 1508) plus the amendments (1604 and 1804). Thus, the four transactions are treated as a singular transaction 1904.

Figure 20:
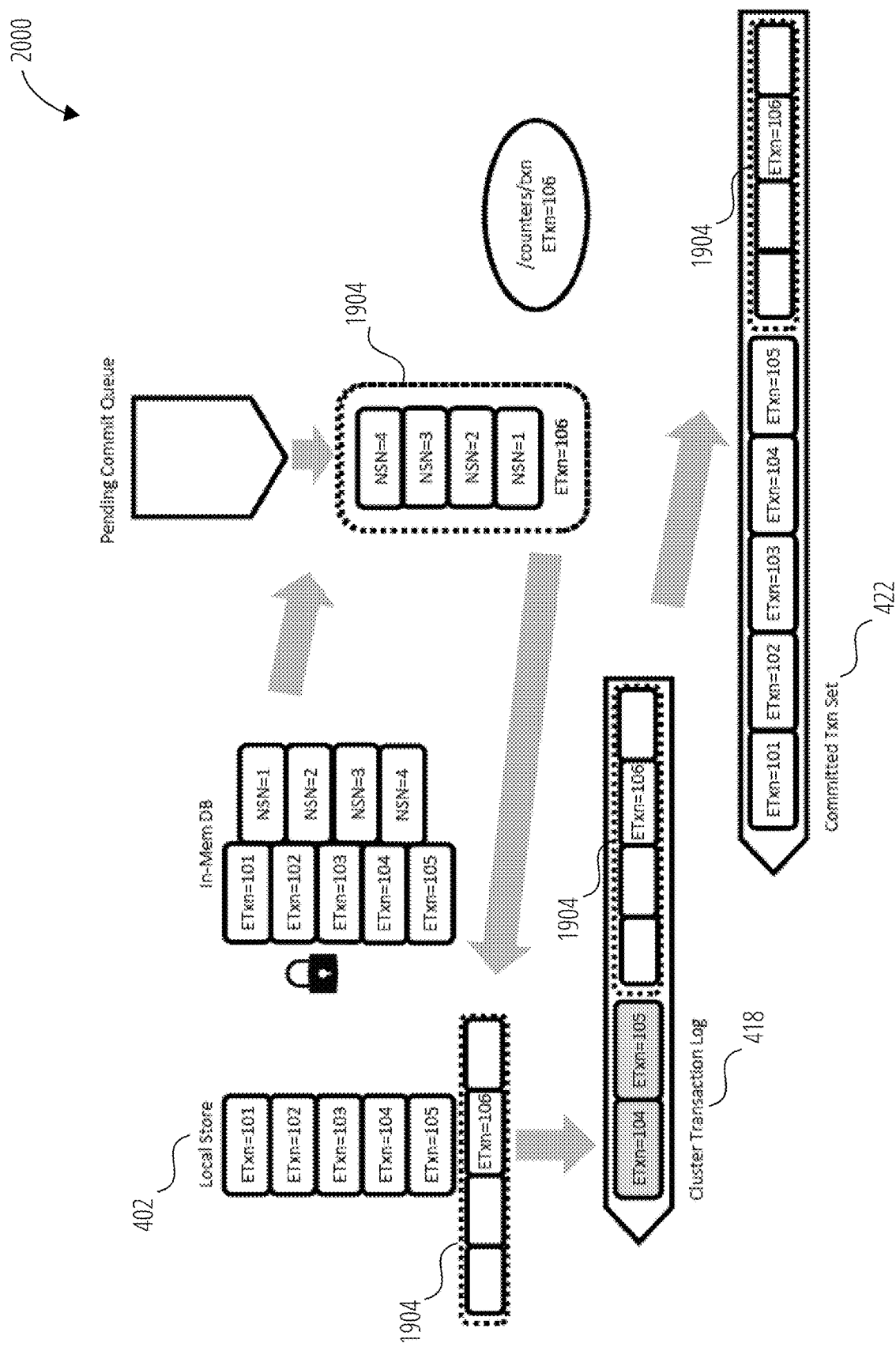
FIG. 20 illustrates an aspect of the subject matter in accordance with one embodiment.

FIG. 20 illustrates a process 2000 to commit a conflict resolution transaction, in accordance with one embodiment. The conflict resolution transaction 1904 is then committed to the local store 402. The conflict resolution transaction 1904 is also committed to the Cluster Transaction Log 418. The conflict resolution transaction 1904 is appended to the Committed Txn Set 422. In each of local store 402, Cluster Transaction Log 418 and Committed Txn Set 422, conflict resolution transaction 1904 has ETxn=206.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    applying, by a processor, one or more transactions to a private in-memory database representation of a data server node;
    capturing, by the processor, contents of a pending transaction in a commit job;
    sending, by the processor, the commit job to a pending commit queue of the database node;
    executing, by the processor, the commit job;
    updating, by the processor, a cluster transaction counter;
    assigning, by the processor, a transaction identification number to the commit job;
    block waiting, by the processor, for all preceding transactions to be replayed; and
    continuously replaying, by the processor, one or more transaction log entries from a cluster transaction log;
    in response to detecting a conflict between an incoming transaction and a second pending transaction of the private in-memory database representation:
        generating, by the processor, a new pending transaction of the private in-memory database that is associated with the incoming transaction;
        sending, by the processor, the new pending transaction to the pending commit queue of the database node; and
        batching together, by the processor, the new pending transaction and each pending transaction of the database node in the pending commit queue including the commit job, into a single conflict resolution transaction configured to resolve the detected conflict between the incoming transaction and the second pending transaction,
    wherein the database nose comprises:
    a private in-memory database representation including a sequence map, the pending commit queue being a data structure external to the private in-memory database representation, and a transaction replay thread that includes a conflict resolver sub-process that generated the new pending transaction, and
    wherein the batching together of the new pending transaction and each pending transaction of the database node in the pending commit queue results in the pending commit queue maintaining consistent atomicity in the private in-memory database representation of the data server node.

2. The computer-implemented method of claim 1, wherein the conflict is detected using a private sequence map of the database node.

3. The computer-implemented method of claim 1, wherein the incoming transaction is excluded from the pending commit queue.

4. The computer-implemented method of claim 1, further comprising:
    committing, by the processor, the conflict resolution transaction to a local store;
    committing, by the processor, the conflict resolution transaction to a cluster transaction log; and
    appending the conflict resolution transaction to a committed transaction set.

5. The computer-implemented method of claim 1, wherein generating the new pending transaction is performed according to one or more user-defined rules for resolving the conflict.

6. The computer-implemented method of claim 1, wherein each pending transaction is identified by a node sequence number (NSN) that sequences pending transactions on the database node and monitors progress through the pending commit queue.

7. The computer-implemented method of claim 1, wherein the continuous replay is performed by a transaction replay thread executing within the database node during the detecting of the conflict.

8. The computer-implemented method of claim 1, wherein:
    the cluster transaction log is a single transaction log shared among a plurality of database nodes in a cluster, and
    the cluster transaction counter is maintained in a distributed key-value store.

9. A computing apparatus comprising:
    a processor; and
    a memory storing instructions that, when executed by the processor, configure the apparatus to:
    apply, by the processor, one or more transactions to a private in-memory database representation of a data server node;
    capture, by the processor, contents of a pending transaction in a commit job;
    send, by the processor, the commit job to a pending commit queue of the database node;
    execute, by the processor, the commit job;
    update, by the processor, a cluster transaction counter;
    assign, by the processor, a transaction identification number to the commit job;
    block wait, by the processor, for all preceding transactions to be replayed; and
    continuously replay, by the processor, one or more transaction log entries from a cluster transaction log;
    in response to detecting a conflict between an incoming transaction and a second pending transaction of the private in-memory database representation:
        generate, by the processor, a new pending transaction of the private in-memory database that is associated with the incoming transaction;
        send, by the processor, the new pending transaction to the pending commit queue of the database node; and batch together, by the processor, the new pending transaction and each pending transaction of the database node in the pending commit queue including the commit job, into a single conflict resolution transaction configured to resolve the detected conflict between the incoming transaction and the second pending transaction, wherein the database node comprises: a private in-memory database representation including a sequence map, the pending commit queue being a data structure external to the private in-memory database representation, and a transaction replay thread that includes a conflict resolver sub-process that generates the new pending transaction, and wherein the batching together of the new pending transaction and each pending transaction of the database node in the pending commit queue results in the pending commit queue maintaining consistent atomicity in the private in-memory database representation of the data server node.

10. The computing apparatus of claim 9, wherein the conflict is detected using a private sequence map of the database node.

11. The computing apparatus of claim 9, wherein the incoming transaction is excluded from the pending commit queue.

12. The computing apparatus of claim 9, wherein the instructions further configure the apparatus to:
commit, by the processor, the conflict resolution transaction to a local store;
commit, by the processor, the conflict resolution transaction to a cluster transaction log; and
append the conflict resolution transaction to a committed transaction set.

13. The computing apparatus of claim 12, wherein generating the new pending transaction is performed according to one or more user-defined rules for resolving the conflict.

14. A non-transitory computer-readable storage medium, the computer-readable storage medium including instructions that when executed by a computer, cause the computer to:
apply, by a processor, one or more transactions to a private in-memory database representation of a data server node;
capture, by the processor, contents of a pending transaction in a commit job;
send, by the processor, the commit job to a pending commit queue of the database node;
execute, by the processor, the commit job;
update, by the processor, a cluster transaction counter;
assign, by the processor, a transaction identification number to the commit job;

block wait, by the processor, for all preceding transactions to be replayed; and
continuously replay, by the processor, one or more transaction log entries from a cluster transaction log;
in response to detecting a conflict between an incoming transaction and a second pending transaction of the private in-memory database representation:
generate, by the processor, a new pending transaction of the private in-memory database that is associated with the incoming transaction;
send, by the processor, the new pending transaction to the pending commit queue of the database node; and
batch together, by the processor, the new pending transaction and each pending transaction of the database node in the pending commit queue including the commit job, into a single conflict resolution transaction configured to resolve the detected conflict between the incoming transaction and the second pending transaction, wherein the database node comprises: a private in-memory database representation including a sequence map, the pending commit queue being a data structure external to the private in-memory database representation, and a transaction replay thread that includes a conflict resolver sub-process that generates the new pending transaction, and wherein the batching together of the new pending transaction and each pending transaction of the database node in the pending commit queue results in the pending commit queue maintaining consistent atomicity in the private in-memory database representation of the data server node.

15. The computer-readable storage medium of claim 14, wherein the conflict is detected using a private sequence map of the database node.

16. The computer-readable storage medium of claim 14, wherein the incoming transaction is excluded from the pending commit queue.

17. The computer-readable storage medium of claim 14, wherein the instructions further configure the computer to:
commit, by the processor, the conflict resolution transaction to a local store;
commit, by the processor, the conflict resolution transaction to a cluster transaction log; and
append the conflict resolution transaction to a committed transaction set.

18. The computer-readable storage medium of claim 14, wherein generating the new pending transaction is performed according to one or more user-defined rules for resolving the conflict.

* * * * *